United States Patent
Wang et al.

(10) Patent No.: US 12,438,651 B2
(45) Date of Patent: Oct. 7, 2025

(54) HARQ FEEDBACK METHOD, TERMINAL AND BASE STATION

(71) Applicant: DATANG MOBILE COMMUNICATIONS EQUIPMENT CO., LTD., Beijing (CN)

(72) Inventors: Junwei Wang, Beijing (CN); Rui Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 397 days.

(21) Appl. No.: 17/911,140

(22) PCT Filed: Feb. 3, 2021

(86) PCT No.: PCT/CN2021/075074
§ 371 (c)(1),
(2) Date: Sep. 13, 2022

(87) PCT Pub. No.: WO2021/196880
PCT Pub. Date: Oct. 7, 2021

(65) Prior Publication Data
US 2023/0107562 A1  Apr. 6, 2023

(30) Foreign Application Priority Data
Mar. 30, 2020 (CN) .......................... 202010239180.4

(51) Int. Cl.
*H04L 1/18* (2023.01)
*H04L 1/1829* (2023.01)
(Continued)

(52) U.S. Cl.
CPC .......... *H04L 1/1861* (2013.01); *H04L 1/1858* (2013.01); *H04L 5/0055* (2013.01);
(Continued)

(58) Field of Classification Search
CPC ... H04L 1/1861; H04L 1/1858; H04L 5/0055; H04L 1/1812; H04W 72/21; H04W 72/0446
See application file for complete search history.

(56) References Cited

U.S. PATENT DOCUMENTS

2019/0349941 A1  11/2019  Yang et al.
2020/0358562 A1* 11/2020  Peng ............... H04L 5/0094
(Continued)

FOREIGN PATENT DOCUMENTS

CN  108880630 A  11/2018
CN  109152053 A   1/2019
(Continued)

OTHER PUBLICATIONS

OPPO, "Summary#1 on UCI enhancements for R16 URLLC", 3GPP TSG RAN WG1 #100-e, e-Meeting, Feb. 24-Mar. 6, 2020, total 51 pages, R1-2001016.
(Continued)

*Primary Examiner* — Derrick V Rose
(74) *Attorney, Agent, or Firm* — KILPATRICK TOWNSEND & STOCKTON LLP

(57) ABSTRACT

Provided in the embodiments of the present application are an HARQ feedback method, a terminal, and a base station. The method includes obtaining a target timeline parameter value for indicating a timing at which the terminal feeds back HARQ-ACK; a target timeline parameter sequence being predefined between the terminal and a base station, and the target timeline parameter sequence including multiple sequence index values and multiple timeline parameter values which have one-to-one correspondence; the timeline parameter value indicating slot intervals between a HARQ-ACK feedback slot and a last symbol of PDSCH, or the timeline parameter value indicating a slot where a PUCCH resource is located and the slot where the PUCCH resource is located corresponding to the HARQ-ACK feedback slot; and the target timeline parameter value being one of multiple timeline parameter values, and a time corresponding to the target timeline parameter value being equal to or greater than a time corresponding to a capability parameter value of (Continued)

PDSCH reception processing for UE; and feeding back the HARQ-ACK to the base station on the slot corresponding to the target timeline parameter value.

20 Claims, 4 Drawing Sheets

(51) Int. Cl.
　　　*H04L 5/00*　　　　(2006.01)
　　　*H04W 72/04*　　　(2023.01)
　　　*H04W 72/0446*　　(2023.01)
　　　*H04W 72/21*　　　(2023.01)
　　　*H04L 1/1812*　　　(2023.01)
(52) U.S. Cl.
　　　CPC ....... *H04W 72/0446* (2013.01); *H04W 72/21* (2023.01); *H04L 1/1812* (2013.01)

(56) References Cited

U.S. PATENT DOCUMENTS

2022/0321272 A1* 10/2022 Yoshioka .............. H04L 1/1854
2023/0079128 A1*  3/2023 Wang ................... H04W 72/23
　　　　　　　　　　　　　　　　　　　　　　370/329

FOREIGN PATENT DOCUMENTS

| CN | 110300452 A | 10/2019 |
|---|---|---|
| CN | 110831055 A | 2/2020 |
| CN | 111565093 A | 8/2020 |
| KR | 20190097296 A | 8/2019 |
| WO | 2020030061 A1 | 2/2020 |

OTHER PUBLICATIONS

European Patent Office, the Extended European Search Report Issued in Application No. 21779376.9, Mar. 14, 2024 Germany, 11 pages.
LG Electronics,"Considerations on HARO process and feedback for NR", 3GPP TSG RAN WG1 Meeting NR#3, Nagoya, Japan, Sep. 18-21, 2017, total 14 pages, R1-1715886.
State Intellectual Property Office of the People's Republic of China, supplementary search report issued in application No. 2020102391804.
Japanese Patent Office, Grant decision issued in application No. 2022-559702.
Samsung,"Remaining details for IAB-MT access", 3GPP TSG-RAN WG2 #109-e, E-meeting, Feb. 2020, total 2 pages, R2-2001016.
The first office action issued in counterpart Korea application 10-2022-7036781, mailed on Jan. 3, 2025.

* cited by examiner

HARQ FEEDBACK METHOD, TERMINAL AND BASE STATION

CROSS-REFERENCE TO RELATED APPLICATION

The present application is a US National Stage of International Application No. PCT/CN2021/075074, filed on Feb. 3, 2021, which claims priority to Chinese application No. 202010239180.4, filed on Mar. 30, 2020, entitled "HARQ Feedback Method, Terminal and Base Station", which are hereby incorporated by reference in their entireties.

FIELD

The present application relates to the field of communication, and in particular, to an HARQ feedback method, a terminal, and a base station.

BACKGROUND

With the development of wireless communication, users have raised higher requirements for mobile communication, especially for communication bandwidth and communication rate. For example, the rate is expected to reach gigabit order. In order to meet the requirements of users' requirements for high communication rate, a frequency spectrum with a larger bandwidth needs to be developed. In the current 5G new radio (New Radio. NR) technology, there is a support for the communication between a terminal and a base station over two bands with a frequency range (Frequency Range, FR) of FR1 and FR 2 respectively. The range of FR1 is from 410 MHz to 7.125 GHz, and the range of FR2 is from 24.25 GHz to 52.6 GHz.

In the current 3GPP standard, mobile wireless communication in the frequency band of 52.6 GHz-71 GHz has been studied. Higher communication frequency will bring greater bandwidth advantage, but brings greater challenge to wireless communication design, which is a result mainly caused by that higher frequency has greater Doppler frequency offset and will generate greater phase noise. In order to overcome the influence of Doppler and phase noise caused by high frequency, a higher sub-carrier spacing (Sub-Carrier Spacing, SCS) is used, for example, SCS=240 KHz, SCS=480 KHz, SCS=90 KHz, or the like.

When the base station transmits downlink data to the terminal, the timeline parameter, for indicating the terminal to feed back hybrid automatic repeat request-acknowledgement (Hybrid Automatic Repeat Request-Acknowledgement, HARQ-ACK) is needed and indicated by k1, where the value of k1 is equal to or greater than the value of the processing capability N1 of the terminal. However, the range of k1 gradually increases as the SCS increases, and the traditional statically configured default parameter k1 (1, 2, 3, 4, 5, 6, 7, 8) does not meet the requirements for the indication.

SUMMARY

The embodiments of the present application provide an HARQ feedback method, a terminal and a base station to indicate HARQ-ACK feedback in case that SCS is larger than 120 KHz.

The embodiments of the present application provide an HARQ feedback method, performed by a terminal and the method includes:

obtaining a target timeline parameter value for indicating a timing at which the terminal feeds back HARQ-ACK; a target timeline parameter sequence is predefined between the terminal and a base station, and the target timeline parameter sequence includes multiple sequence index values and multiple timeline parameter values which have one-to-one correspondence; the timeline parameter value indicates slot intervals between a HARQ-ACK feedback slot and the last symbol of the physical downlink shared channel (Physical Downlink Shared Channel, PDSCH), or the timeline parameter value indicates a slot where a physical uplink control channel (Physical Uplink Control Channel, PUCCH) resource is located and the slot where the PUCCH resource is located corresponds to the HARQ-ACK feedback slot; and the target timeline parameter value is one of multiple timeline parameter values, and a timing corresponding to the target timeline parameter value is equal to or greater than a timing corresponding to a capability parameter value of PDSCH reception processing for UE; and feeding back the HARQ-ACK to the base station on the slot corresponding to the target timeline parameter value.

The embodiments of the present application provide an HARQ feedback method, performed by a base station and includes:

obtaining a capability parameter value of PDSCH reception processing for UE; determining a target timeline parameter sequence for the terminal to feed back HARQ-ACK, the target timeline parameter sequence includes multiple sequence index values and multiple timeline parameter values which have one-to-one correspondence; the timeline parameter value indicates slot intervals between a HARQ-ACK feedback slot and the last symbol of the PDSCH, or the timeline parameter value indicates a slot where a PUCCH resource is located and the slot where the PUCCH resource is located corresponds to the HARQ-ACK feedback slot; and a time corresponding to one or more timeline parameter values in the target timeline parameter sequence is equal to or greater than a time corresponding to the capability parameter value of PDSCH reception processing for UE; and transmitting HARQ-ACK feedback indication information to the terminal, to indicate a target sequence index value corresponding to a target timeline parameter value to the terminal, and the target sequence index value is one of multiple sequence index values.

The embodiments of the present application provide an HARQ feedback device, which is applied to a terminal and includes:

an obtaining device configured to obtain a target timeline parameter value for indicating a timing at which the terminal feeds back HARQ-ACK; a target timeline parameter sequence is predefined between the terminal and a base station, and the target timeline parameter sequence includes multiple sequence index values and multiple timeline parameter values which have one-to-one correspondence; the timeline parameter value indicates slot intervals between a HARQ-ACK feedback slot and the last symbol of the PDSCH, or the timeline parameter value indicates a slot where a PUCCH resource is located and the slot where the PUCCH resource is located corresponds to the HARQ-ACK feedback slot; and the target timeline parameter value is one of multiple timeline parameter values, and a time corresponding to the target timeline parameter value is equal to or greater than a time corresponding to a capability parameter value of PDSCH reception processing for UE; and a transmitting device configured to feed back the HARQ-ACK to the base station on the slot corresponding to the target timeline parameter value.

The embodiments of the present application provide an HARQ feedback device, which is applied to a base station, and includes:

an obtaining device configured to obtain a capability parameter value of physical downlink shared channel (Physical Downlink Shared Channel, PDSCH) reception processing for UE; a determining device configured to determine a target timeline parameter sequence for the terminal to feed back HARQ-ACK, the target timeline parameter sequence includes multiple sequence index values and multiple timeline parameter values which have one-to-one correspondence; the timeline parameter value indicates slot intervals between a HARQ-ACK feedback slot and a last symbol of the PDSCH, or the timeline parameter value indicates a slot where a PUCCH resource is located and the slot where the PUCCH resource is located corresponds to the HARQ-ACK feedback slot; and a time corresponding to one or more timeline parameter values in the target timeline parameter sequence is equal to or greater than a time corresponding to a capability parameter value of PDSCH reception processing for UE; and a transmitting device configured to transmit HARQ-ACK feedback indication information to the terminal, to indicate a target sequence index value corresponding to a target timeline parameter value to the terminal, and the target sequence index value is one of multiple sequence index values.

Embodiments of the present application provide a terminal, including a processor, and a memory storing a computer program and executable on the processor, where the computer program, when executed by the processor, causes the processor to perform the steps of the above method.

Embodiments of the present application provide a base station, including a processor, and a memory storing a computer program and executable on the processor, where the computer program, when executed by the processor, causes the processor to perform the steps of the above method.

Embodiments of the present application provide a non-transitory computer-readable storage medium having computer programs stored thereon, that, when executed by a processor, cause the processor to perform the steps of the above method.

According to the HARQ feedback method, the terminal and the base station according to the present application, by obtaining the target timeline parameter value for indicating the timing at which the terminal feeds back the HARQ-ACK, and feeding back the HARQ-ACK according to the target timeline parameter value, due to the fact that the time corresponding to the target timeline parameter value is equal to or greater than the time corresponding to the capability parameter value of PDSCH reception processing for UE, in case of corresponding terminal capacity, the terminal can completely receive downlink data and feed back the HARQ-ACK information prior to the timing unit length corresponding to the reception processing capacity parameter value, and the feedback timing of the HARQ-ACK is effectively indicated when SCS is larger than 120 KHz.

BRIEF DESCRIPTION OF THE DRAWINGS

The embodiments of the present application, the accompanying drawings in the description of the embodiments will be briefly described below, and it should be noted that the drawings in the following descriptions are some embodiments of the present application.

DETAILED DESCRIPTION

Figure 1:
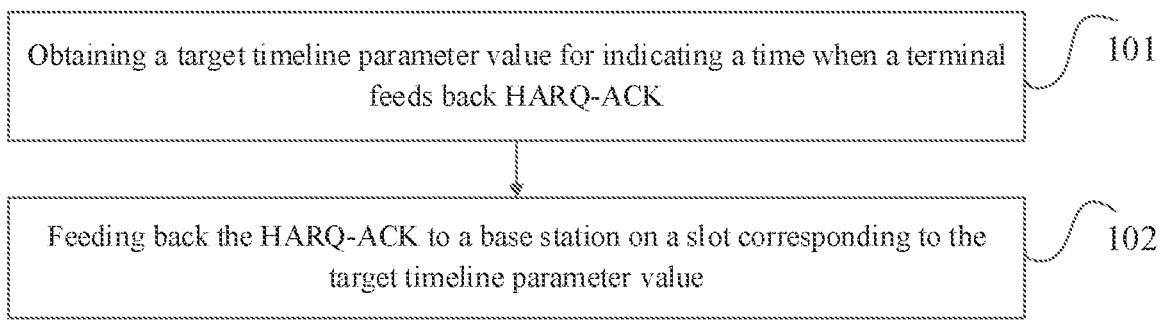
FIG. 1 is a flowchart showing steps of an HARQ-ACK feedback method performed by a terminal according to an embodiment of the present application.

The embodiments of the present application will be clearly and completely described below in conjunction with the drawings in the embodiments of the present application. It should be noted that, the described embodiments are some embodiments of the present application, but not all embodiments.

In order to clearly describe the solutions of the embodiments of the present application, in the respective embodiments of the present application, if words such as "first" and "second" are used to distinguish identical items or similar items with substantially the same functions and actions, and "first" and "second" do not limit the quantity and execution order.

It should be noted that the PDSCH in the embodiments of the present application refers to a physical downlink shared channel, and may be broadly referred to as a data channel.

In a wireless communication environment, an error may occur during data transmission since the channel quality is rapidly changed. In order to improve the reliability of data transmission and meet the requirements of different services for different transmission qualities, the standard adopts hybrid automatic repeat request (Hybrid Automatic Repeat Request, HARQ) process, that is, the receiving end decodes the received data and feeds back the decoding result to the transmitting end, and ACK is fed back when the decoding result is correct, and NACK is fed back when the decoding result is incorrect. The data transmitting end determines whether to retransmit the data according to the received decoding feedback information. Generally, data retransmission is performed when the feedback information received by the data transmitting end is NACK, and data retransmission is not performed when the received feedback information is ACK and then this data transmission is ended.

In addition, the transmitting end transmits data scheduling information on a physical downlink control channel (Physical Downlink Control Channel, PDCCH), and the scheduling information includes: a timing domain location and a frequency domain position of the data channel; the modulation and a coding format of the data channel, which denotes the modulation order and the channel coding rate adopted by a physical downlink shared channel (Physical Downlink Shared Channel PDSCH); and timing domain information k1 for feeding back HARQ-ACK, which denotes the location of the HARQ-ACK feedback slot from the PDSCH, for example, when k1=0, it is denoted that HARQ-ACK and PDSCH are fed back in the same slot. The receiving end detects the PDCCH, receives PDSCH data according to the data scheduling information transmitted on the PDCCH, demodulates and decodes the data, and feeds back a decoding result to the base station on a specified slot.

In addition, the actions required to be performed when the receiving end (for example, the terminal) performs the HARQ process include: detecting the PDCCH, parsing the PDCCH, performing channel estimation, demodulation and channel decoding on PDSCH, and feeding back HARQ-ACK. During the entire process, timing durations to receive PDSCH by terminals with different capabilities (denoted by N1) are different, that is, capability parameter values of PDSCH reception processing for UE are different. For example, when the index value of SCS is 1, the capability parameter value of PDSCH reception processing for UE is 10 or 13 symbols. The value of N1 refers to the number of symbols between the last symbol of PDSCH reception and the first symbol of HARQ-ACK feedback, that is, when the base station schedules terminal data and indicates HARQ-ACK feedback timing, the timing interval k1 between the HARQ-ACK feedback timing and PDSCH is equal to or greater than the value of N1. The information of k1 in the current standard is indicated in the control channel information, by PDSCH-to-HARQ_feedback timing indicator field of 3 bits, which represents eight types and includes two scenarios of direct indication and indirect indication. The scenario of direct indication is a default scenario determined by the standard, which has a value set of {1, 2, 3, 4, 5, 6, 7, 8} and is indicated directly by 3 bits, for example, 000 corresponds to 1, 001 corresponds to 2, and so on. The value indicated indirectly is not limited to the maximum value of 8 in the default scenario, and the specific indicated indirectly value is configured by higher laver signaling. For example, it may be configured as {2, 4, 5.7, 8, 9, 10, 11} by higher layer signaling and is indicated by 3 bits, for example, 000 corresponds to 2, 001 corresponds to 4, and so on. In the related standard, only direct indication can be adopted before configuring indirect indication, and configuration information is required to be executed after the terminal is in a connected state.

However, only the UE processing capability indication (the maximum of SCS is 120 KHz) in the cases of FR1 and FR2, that is, the corresponding N1 value, is determined in the traditional standard. For 52.6 GHz and above. SCS may be greater than 120 KHz, such as 240 KHz, 480 KHz and 960 KHz, and how to define and indicate the values of related N1 has not been explicitly illustrated. Furthermore, for 52.6 GHz and above, SCS may greater than 120 KHz, such as 240 KHz, 480 KHz and 960 KHz, and the default set of values {1, 2, 3, 4, 5, 6, 7, 8} of k1 defined previously is unable to be well applied for the following reasons: as SCS increases, the required value of N1 increases, for example, when SCS=960 KHz, the value of N1 may be defined as 24×8=192 symbols, which is equivalent to 13 (192/14=13.7 slots) slots and exceeds the range of 1-8 indicated by k1. In addition, as SCS increases, the uplink slot may not be found in a period (for example, the minimum period of the current configuration is 0.625 ms) in 8 slots when the uplink/downlink slots of the system is configured. For example, when SCS=480 KHz, the time duration of 1 slot is $\frac{1}{32}$ ms, and then 0.625 ms includes 20 slots; and when SCS=960 KHz, the time duration of 1 slot is $\frac{1}{64}$ ms, and then 0.625 ms includes 40 slots. If the slot ratios of uplink and downlink are equal, for the PDSCH scheduling in some slots, the uplink slot HARQ-ACK feedback slot is unable to be found within 8 slots, and at this time, since the selection range of k1 is 1 to 8, the data scheduling requiring HARQ-ACK feedback can only be scheduled within a limited slot range (for example, the data scheduling can only be scheduled from slot 2 to slot 9 when there are 20 slots), which limits the flexibility of scheduling data by the base station.

When the SCS is greater than 120 KHz, it is needed to provide an explicit scheme for determining the PDSCH reception processing capability parameter value N1. The traditional value range of k1 cannot indicate HARQ-ACK due to the change in the value of N1, and when the value range of k1 is expanded, the header overhead for indicating k1 becomes larger, which increases the overhead of the system. At this time, it is also needed to provide an explicit scheme of indication for HARQ-ACK feedback timing in a larger range in case that the header overhead of the indication is not changed. In this regard, embodiments of the present application provide the schemes as follows.

As shown in FIG. 1, it is a flowchart illustrating steps of an HARQ feedback method performed by a terminal according to the embodiment of the present application, where the method includes the following steps.

Step 101, obtaining a target timeline parameter value for indicating a timing at which a terminal feeds back hybrid automatic repeat request-acknowledgement (Hybrid Automatic Repeat Request-Acknowledgement, HARQ-ACK).

In one embodiment, in this step, the terminal obtains the target timeline parameter value for indicating the timing at which the terminal feeds back HARQ-ACK by a base station.

A target timeline parameter sequence is predefined between the terminal and the base station, and the target timeline parameter sequence is provided with one-to-one correspondences between multiple sequence index values and multiple timeline parameter values.

In addition, the timeline parameter value refers to slot intervals between an HARQ-ACK feedback slot and a last symbol of physical downlink shared channel (Physical Downlink Shared Channel, PDSCH), or the timeline parameter value indicates a slot where the PUCCH resource is located and the slot where the PUCCH resource is located corresponds to the HARQ-ACK feedback slot.

In addition, the target timeline parameter value is one of multiple timeline parameter values, and a time corresponding to the target timeline parameter value is equal to or greater than a time corresponding to the capability parameter value of PDSCH reception processing for UE. Namely, it can be ensured that the timing for feeding back HARQ-ACK indicated by the target timeline parameter value is later than a timing at which the terminal receives the PDSCH, and the terminal can feed back HARQ-ACK after the PDSCH is entirely received.

Further, it should be noted that the capability parameter value of PDSCH reception processing may be a capability parameter value of PDSCH reception processing (denoted by N1) corresponding to a new SCS parameter which includes at least one of 240 KHz, 480 KHz, 960 KHz or 1920 KHz. This enables the terminal, in case of corresponding terminal capability, to completely receive downlink data and to feed back HARQ-ACK information prior to N1 timing unit lengths.

It should be noted that the unit of N1 may be a symbol or a slot, and the unit of N1 in this embodiment is a symbol unless otherwise specifically indicated, and it is not limited in practical application.

In step 102: feeding back the HARQ-ACK to the base station on the slot corresponding to the target timeline parameter value.

In this step, after obtaining the target timeline parameter value, the terminal may directly feed back HARQ-ACK to the base station on the slot corresponding to the target timeline parameter value.

At this time, because the time corresponding to the target timeline parameter value is greater than the time corresponding to the capability parameter value of PDSCH reception processing for UE, in case of corresponding terminal capability, the terminal can completely receive downlink data and can feed back HARQ-ACK information prior to the timing unit length corresponding to the capability parameter value of PDSCH reception processing for UE, and the feedback timing of HARQ-ACK is effectively indicated when the SCS is greater than 120 KHz.

Furthermore, in this embodiment, the terminal may obtain the target timeline parameter value for indicating the timing at which the terminal feeds back HARQ-ACK by any one of the following schemes.

Scheme 1, when the target timeline parameter sequence is a first default timeline parameter sequence or a second default timeline parameter sequence, a first control signaling sent by the base station is received.

In this case, the target timeline parameter value may be obtained by directly receiving the first control signaling sent by the base station.

In one embodiment, the first control signaling carries a first target sequence index value, the first target sequence index value is one of multiple sequence index values in the target timeline parameter sequence, and a timeline parameter value corresponding to the first target sequence index value is the target timeline parameter value, and then the terminal can obtain the target timeline parameter value by parsing the first target sequence index value, and obtain the HARQ-ACK feedback slot.

In addition, it should be noted that, when the target timeline parameter sequence is the second default timeline parameter sequence, each timeline parameter value in the target timeline parameter sequence indicates the i-th slot with PUCCH resource after the terminal receives PDSCH, where i is a corresponding timeline parameter value; and when the target timeline parameter sequence is the first default timeline parameter sequence, each timeline parameter value in the target timeline parameter sequence indicates the slot interval between the HARQ-ACK feedback slot and a last symbol of PDSCH.

That is, in this case, the target timeline parameter sequence may be the first default timeline parameter sequence or the second default timeline parameter sequence. The default timeline parameter sequence k1={1, 2, 3, 4, 5, 6, 7, 8} in the traditional standard may be used as the first default timeline parameter sequence. The second default timeline parameter sequence may be agreed by an interface protocol between the base station and the terminal. For example, the second default timeline parameter sequence is k1={4, 5, 6, 7, 8, 9, 10, 11}. The second default timeline parameter sequence may also be broadcasted to the terminal via a higher layer message and may be k1={n4, n5, n6, n7, n8, n9, n10, n11}. The time corresponding to the value of k1 in all the second default timeline parameter sequences broadcasted by the higher layer message is greater than the time of PDSCH reception processing at a reference SCS (e.g., the value is equal to or greater than (N1/14) slots, where N1 denotes the time of PDSCH reception processing), where, the reference SCS may be 120 KHz, or may be the SCS scheduling PDSCH. In addition, when the second default timeline parameter sequence and the first default timeline parameter sequence are configured, the second default timeline parameter sequence is adopted when the SCS scheduling PDSCH is greater than a SCS (e.g., 120 KHz). Otherwise, the first default timeline parameter sequence is adopted.

It can be determined that the second default timeline parameter sequence is configured when new elements are added to the traditional first default timeline parameter sequence, and when the sequence values are mapped, start positions are different. For example, the traditional first default timeline parameter sequence is k1={1, 2, 3, 4, 5, 6, 7, 8}, and the first default timeline parameter sequence can be extended to a second default timeline parameter sequence k1={1, 2, 3, 4, 5, 6.7, 8.9, 10, 11, 12, 13, 14, 15, 16}. When the scheduled SCS is less than or equal to SCS1 (e.g., SCS1=120 KHz), the sequence index values start with 1 (000 corresponds to 1, 001 corresponds to 2, and so on), and when the scheduled SCS is greater than SCS1 and less than or equal to SCS2 (e.g., SCS1=120 KHz, SCS2=480 KHz), the sequence index values start with 2 (000 corresponds to 2, 001 corresponds to 3, and so on).

In addition, when the target timeline parameter value indicates the i-th slot with PUCCH resource after the terminal receives PDSCH, that is, indicates the i-th PUCCH resource, the terminal may calculate a corresponding slot with PUCCH resource by using the target timeline parameter value, where the slot corresponds to HARQ-ACK feedback timing. For example, when the terminal receives PDSCH data scheduled by the base station, the PDSCH data includes an HARQ-ACK feedback timing information indication, such as a timeline parameter value (represented by k1) indicated by a PDSCH-to-HARQ_feedback timing indicator field. This field can be interpreted according to the definition of timeline parameter value in this embodiment, for example, after the scheduled PDSCH (slot n), slots with PUCCH resource are slot (n+4), slot (n+7), slot (n+10), and the like. In this case, when k1=1 (e.g., bit information is 000), it denotes that HARQ-ACK is fed back on the first slot with PUCCH resource, that is, on the slot (n+4). When k1=2 (e.g., bit information is 001), it denotes that HARQ-ACK is fed back on the second slot with PUCCH resource; and when k1=3 (e.g., bit information is 010), it denotes that HARQ-ACK is fed back on the third slot with PUCCH resource. It should be noted that, the slot where the PUCCH resource is located corresponding to the target timeline parameter value is greater than the time corresponding to the capability parameter value of PDSCH reception processing for UE.

Scheme 2: when the target timeline parameter sequence consists of the first default timeline parameter sequence and a timeline offset value, both a second control signaling sent by the base station and a higher layer signaling sent by the base station are received, or the second control signaling sent by the base station is received and the timeline offset value predefined by a protocol is obtained.

In this way, when the target timeline parameter sequence consists of the first default timeline parameter sequence and the timeline offset value, that is, the timeline parameter value includes a default parameter value and the timeline offset value, the target timeline parameter value can be obtained indirectly by obtaining the default parameter value and the timeline offset value respectively. For example, a target default parameter value can be obtained by receiving the second control signaling sent by the base station, and the timeline offset value can be obtained by receiving the higher layer signaling sent by the base station or obtaining the timeline offset value predefined by the protocol.

In one embodiment, the second control signaling carries a second target sequence index value, and the high layer signaling carries the timeline offset value. The second target sequence index value is one of multiple sequence index values, a sum of the target default parameter value corresponding to the second target sequence index value and the timeline offset value is the target timeline parameter value, and the target default parameter value is one of the first default timeline parameter sequences. In this case, each timeline parameter value in the target timeline parameter sequence indicates slot intervals between the HARQ-ACK feedback slot and the last symbol of PDSCH.

Since the target timeline parameter sequence consists of the first default timeline parameter sequence and the timeline offset value, that is, the timeline parameter value includes the default parameter value and timeline offset value, the timeline parameter value and the default parameter value included in the timeline parameter value correspond to the same sequence index value. That is, the sequence index value of each timeline parameter value corresponds to a default parameter value in a default timeline parameter sequence. For example, if the first default timeline parameter sequence is k1={1, 2, 3, 4, 5, 6, 7, 8} and the timeline offset value is 5, the target timeline parameter sequence is {1, 2, 3, 4, 5, 6, 7, 8}+5; and if value 1 in the first default timeline parameter sequence corresponds to a sequence index value of 000, value 6 in the target timeline parameter sequence also corresponds to the sequence index value of 000.

It should be further noted that the default parameter value corresponding to the sequence index value may be a value in a default timeline parameter sequence in a traditional standard, such as a value in the first default timeline parameter sequence k1={1, 2, 3, 4, 5, 6, 7, 8}.

Scheme 3: when the target timeline parameter sequence consists of the first default timeline parameter sequence and a timeline offset factor, both a second control signaling sent by the base station is received and a higher layer signaling sent by the base station is received, or the second control signaling sent by the base station is received and the timeline offset factor predefined by the protocol is received.

In this way, if the target timeline parameter sequence consists of the first default timeline parameter sequence and the timeline offset factor, that is, the timeline parameter value includes the default parameter value and the timeline offset factor, the target timeline parameter value can be obtained indirectly by obtaining the default parameter value and the timeline offset factor, respectively. For example, the target default parameter value can be obtained by receiving the second control signaling sent by the base station, and the timeline offset factor can be obtained by receiving the higher layer signaling sent by the base station or obtaining the timeline offset factor predefined by the protocol.

In one embodiment, the second control signaling carries a third target sequence index value, and the higher layer signaling carries a timeline offset factor. The third target sequence index value is one of multiple sequence index values, a product of a target default parameter value corresponding to the third target sequence index value and the timeline offset factor is the target timeline parameter value, and the target default parameter value is one of the first default timeline parameter sequence.

In an embodiment, since the default parameter value is a part of the timeline parameter value, the sequence index value of each timeline parameter value corresponds to a default parameter value in the first default timeline parameter sequence.

In addition, in this embodiment, before obtaining the target timeline parameter value for indicating the timing at which the terminal feeds back HARQ-ACK, the terminal needs to report the capability parameter value of PDSCH reception processing for UE to the base station, and then the base station can set the target timeline parameter sequence by referring to the capability parameter value of PDSCH reception processing for UE.

It should be noted that, the capability parameter value of PDSCH reception processing for UE may also be written into a protocol, and then the base station can obtain the capability parameter value of PDSCH reception processing for UE by obtaining the parameter written in the protocol.

In addition, the capability parameter value N1 of PDSCH reception processing for UE may be divided into multiple UE capabilities, that is, different values of N1 may be set for different UE capabilities, and the factors considered by determining N1 may include at least one of: a maximum bandwidth of PDSCH transmission or the number of frequency domain physical resources, a location of phase tracking reference signal, a maximum length of transport block, the maximum number of transport layers or the type of supported service.

In addition, the capability parameter value of PDSCH reception processing for UE may satisfy any of the following ways.

Way 1: a time duration corresponding to the capability parameter value of PDSCH reception processing for UE is the same as a preset first reference time duration, where the first reference time duration is a time duration corresponding to the capability parameter value of PDSCH reception processing corresponding to the reference SCS value.

In an embodiment, in this manner, when the time duration corresponding to the capability parameter value of PDSCH reception processing for UE is the same as the preset first reference time duration, the capability parameter value of PDSCH reception processing may be $2^X$ times of the capability parameter value of PDSCH reception processing corresponding to the reference SCS value, where X denotes an integer equal to or greater than 0.

Further, in an embodiment, in this manner, the capability parameter value of PDSCH reception processing for UE may be expressed by the following formula:

$$N1_u = N1_m \times 2^{u-m};$$

where, $N1_u$ denotes a capability parameter value of PDSCH reception processing for UE, $N1_m$ denotes a capability parameter value of PDSCH reception processing corresponding to the reference SCS value, u denotes an index value of the target SCS value adopted by the PDSCH for UE, and m denotes an index value of the reference SCS value.

It should be noted that the reference SCS value may be 120 KHz.

In addition, it should be noted that the correspondence relation between the index u of the SCS value and the SCS value is $SCS = 15\ KHz \times 2^u$.

That is, the capability parameter value of PDSCH reception processing for UE may be associated with the capability parameter value of PDSCH reception processing corresponding to SCS of 120 KHz, and the time duration may be maintained to be the same as the time duration defined by SCS of 120 KHz, that is, the inter-symbol conversion may be performed through the relationship between SCS. For example, if the target SCS value adopted by PDSCH is 240 KHz and u=4, the symbol length at this timing is ½ times the symbol length of SCS=120 KHz, that is, $N1_4=2N1_3$; if the target SCS value adopted by PDSCH is 480 KHz and u=5, the symbol length at this timing is ¼ times the symbol length of SCS=120 KHz, that is, $N1_5=4N1_3$; and if the target SCS value adopted by PDSCH is 240 KHz and u=6, the symbol length at this timing is ⅛ times the symbol length of SCS=120 KHz, that is, $N1_6=8N1_3$.

At this time, the capability parameter values of PDSCH reception processing corresponding to different SCSs may be as shown in Table 1 below.

TABLE 1

Capability parameter values of PDSCH reception processing (the number of symbols)

| u | without additional DMRS | with additional DMRS | |
|---|---|---|---|
| 0 | 8 | $N_{1,0}$ | SCS = 15 KHz |
| 1 | 10 | 13 | SCS = 30 KHz |
| 2 | 17 | 20 | SCS = 60 KHz |
| 3 | 20 | 24 | SCS = 120 KHz |
| 4 | 20 × 2 | 24 × 2 | SCS = 240 KHz |
| 5 | 20 × 4 | 24 × 4 | SCS = 480 KHz |
| 6 | 20 × 8 | 24 × 8 | SCS = 960 KHz |

It should be noted that the index value u=4 of the SCS and the subsequent contents are newly added in this embodiment.

Way 2: the time duration corresponding to the capability parameter value of PDSCH reception processing for UE is the same as a second reference time duration, where the second reference time duration is a difference between the first reference time duration and the preset time offset length.

In one embodiment, when the time duration corresponding to the capability parameter value of PDSCH reception processing for UE is the same as the second reference time duration, the capability parameter value of PDSCH reception processing is $2^X$ times of the target value, where the target value is a difference between the capability parameter value of PDSCH reception processing corresponding to the reference SCS value and a preset time offset value, and X denotes an integer equal to or greater than 0.

Further, in an embodiment, in this manner, the capability parameter value of PDSCH reception processing for UE may be expressed by the following formula:

$$N1_u=(N1_m-D)\times 2^{u-m};$$

where, $N1_u$ denotes the capability parameter value of PDSCH reception processing for UE, $N1_m$ denotes the capability parameter value of PDSCH reception processing corresponding to the reference SCS value, D denotes a preset time offset value, u denotes an index value of the target SCS value adopted by the PDSCH for UE, and m denotes an index value of the reference SCS value.

It should be noted that different target SCS values may correspond to different D values, and in this embodiment, D may be a unified value to simplify the formulation of the protocol.

That is, in this way, the capability parameter value of PDSCH reception processing for UE may be associated with the capability parameter value of PDSCH reception processing corresponding to the reference SCS value. For example, it is assumed that the reference SCS value is 120 KHz, that is, the time duration of the capability parameter value of PDSCH reception processing for UE is the same as a time duration which is obtained by subtracting a preset time offset length from the time duration defined by SCS=120 KHz, and if the preset time offset value is a negative value, in essence the preset time offset value is added. For example, if the target SCS value adopted by PDSCH is 240 KHz and u=4, the symbol length at this timing is ½ times of the symbol length of SCS=120 KHz, that is, $N1_4=(N1_3-D)\times 2$; if the target SCS value adopted by PDSCH is 480 KHz and u=5, the symbol length at this timing is ¼ times of the symbol length of SCS=120 KHz, that is, $N1_5=(N1_3-D)\times 4$; and if the target SCS value adopted by PDSCH is 240 KHz and u=6, the symbol length at this timing is ⅛ times of the symbol length of SCS=120 KHz, that is, $N1_6=(N1_3-D)\times 8$.

At this time, the capability parameter values of PDSCH reception processing corresponding to different SCSs may be as shown in Table 2 below.

TABLE 2

Capability parameter values of PDSCH reception processing (the number of symbols)

| u | without additional DMRS | with additional DMRS | |
|---|---|---|---|
| 0 | 8 | $N_{1,0}$ | SCS = 15 KHz |
| 1 | 10 | 13 | SCS = 30 KHz |
| 2 | 17 | 20 | SCS = 60 KHz |
| 3 | 20 | 24 | SCS = 120 KHz |
| 4 | (20 − D) × 2 | (24 − D) × 2 | SCS = 240 KHz |
| 5 | (20 − D) × 4 | (24 − D) × 4 | SCS = 480 KHz |
| 6 | (20 − D) × 8 | (24 − D) × 8 | SCS = 960 KHz |

It should be noted that u=4 and the following data in the Table 2 are newly added in this embodiment.

Way 3: the capability parameter value of PDSCH reception processing for UE is associated with the target SCS value adopted by PDSCH for UE.

In this way, the capability parameter value of PDSCH reception processing for UE is expressed by the following formula:

$$N1_{u-1} \leq N1_u \leq 2N1_{u-1};$$

where, $N1_u$ denotes the capability parameter value of PDSCH reception processing, $N1_{u-1}$ denotes the capability parameter value of PDSCH reception processing for UE corresponding to the adjacent index value.

For example, if the target SCS value adopted by PDSCH is 240 KHz and u=4, the symbol length at this timing is ½ times of the symbol length of SCS=120 KHz and the range of the capability parameter value (denoted by N1) of PDSCH reception processing for UE is $N1_3 \leq N1_4 \leq 2N1_3$. That is, the corresponding values of N1 corresponding to SCS=120 KHz are 20 symbols and 24 symbols, and then $20 \leq N1_4 \leq 40$, or $24 \leq N1_4 \leq 48$. In one embodiment, if the target SCS value adopted by PDSCH is 480 KHz and u=5, the symbol length at this timing is ½ times of the symbol length of SCS=20 KHz and the range of N1 is $N1_4 \leq N1_5 \leq 2N1_4$; and if the target SCS value adopted by PDSCH is 960 KHz and u=6, the symbol length at this timing is ½ times of the symbol length of SCS=120 KHz and the range of N1 is $N1_5 \leq N1_6 \leq 2N1_5$.

At this time, the capability parameter values of PDSCH reception processing for UE corresponding to different SCS may be as shown in Table 3 below.

TABLE 3

Capability parameter values of PDSCH reception processing (the number of symbols)

| u | without additional DMRS | with additional DMRS | |
|---|---|---|---|
| 0 | 8 | $N_{1,0}$ | SCS = 15 KHz |
| 1 | 10 | 13 | SCS = 30 KHz |
| 2 | 17 | 20 | SCS = 60 KHz |
| 3 | 20 | 24 | SCS = 120 KHz |
| 4 | 34 | 38 | SCS = 240 KHz |
| 5 | 48 | 52 | SCS = 480 KHz |
| 6 | 62 | 66 | SCS = 960 KHz |
| 7 | 82 | 86 | SCS = 1920 KHz |
| 8 | 102 | 116 | SCS = 3840 KHz |

It should be noted that u=4 and the following data in the Table 3 are newly added in this embodiment.

In this embodiment, by obtaining the target timeline parameter value for indicating the timing at which the terminal feeds back HARQ-ACK, where the time corresponding to the target timeline parameter value is greater than the time corresponding to the capability parameter value of PDSCH reception processing for UE, and feeding back HARQ-ACK to the base station on the slot corresponding to the target timeline parameter value, in case of corresponding terminal capability, the terminal can completely receive downlink data prior to the timing unit length corresponding to the capability parameter value of PDSCH reception processing for UE and can feed back HARQ-ACK information, and then the feedback timing of HARQ-ACK can be effectively indicated when the SCS is greater than 120 KHz.

Figure 2:
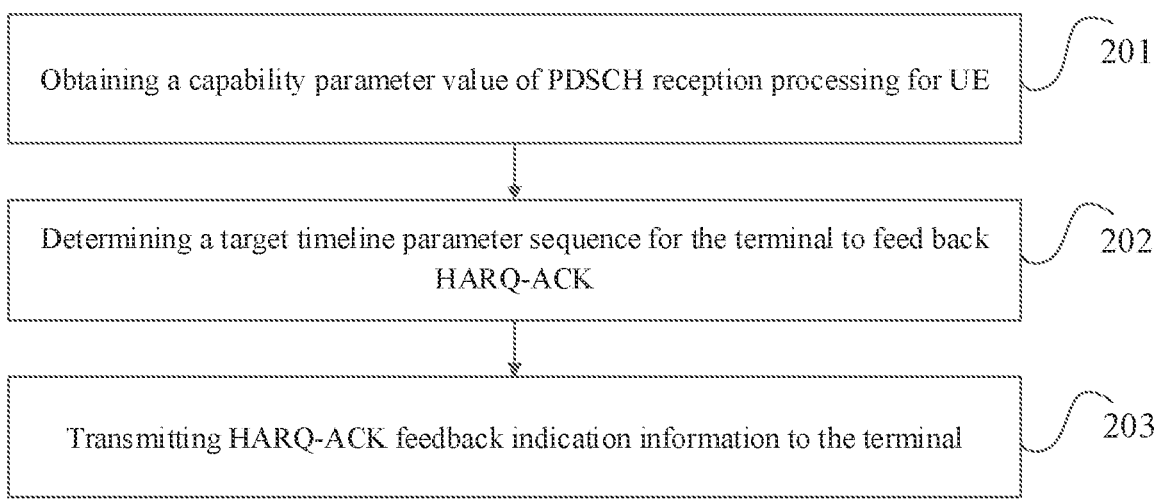
FIG. 2 is a flowchart showing steps of an HARQ-ACK feedback method performed by a base station according to an embodiment of the present application.

In addition, as shown in FIG. 2, it is a flowchart illustrating steps of an HARQ feedback method performed by a base station according to the embodiment of the present application, where the method includes the following step:

Step 201, obtaining a capability parameter value of PDSCH reception processing for UE.

In this step, base station obtains the capability parameter value of PDSCH reception processing for UE.

In addition, when obtaining the capability parameter value of PDSCH reception processing for UE, the base station may receive the capability parameter value of PDSCH reception processing for UE reported by the terminal, or the base station may obtain the capability parameter value of PDSCH reception processing for UE predefined by a protocol, which is not particularly limited herein.

Step 202, determining a target timeline parameter sequence for the terminal to feed back HARQ-ACK.

In this step, after obtaining the capability parameter value of PDSCH reception processing for UE, the base station may determine the target timeline parameter sequence for the terminal to feed back HARQ-ACK.

The target timeline parameter sequence includes multiple sequence index values and multiple timeline parameter values which have one-to-one correspondence. The timeline parameter value refers to slot intervals between a HARQ-ACK feedback slot and a last symbol of physical downlink shared channel (Physical Downlink Shared Channel, PDSCH), or the timeline parameter value indicates a slot where the PUCCH resource is located and the slot where the PUCCH resource is located corresponds to the HARQ-ACK feedback slot.

In addition, a time corresponding to the target timeline parameter value among the timeline parameter values is equal to or greater than a time corresponding to the capability parameter value of PDSCH reception processing for UE. In case of corresponding terminal capability, the terminal can completely receive downlink data prior to the timing unit length corresponding to the capability parameter value of PDSCH reception processing for UE and can feed back HARQ-ACK information, and then a feedback timing of HARQ-ACK is effectively indicated when SCS is larger than 120 KHz.

When the target timeline parameter value indicates the slot interval between the HARQ-ACK feedback slot and the last symbol of PDSCH, and the unit of the target timeline parameter value is not the same as the unit of the capability parameter value of PDSCH reception processing for UE, these units are converted into the same. For example, when the unit of the capability parameter value (represented by N1) of PDSCH reception processing for UE is a symbol and the unit of the target timeline parameter value (represented by k1) is a slot, k1 needs to be multiplied by a factor N (N is the number of symbols included in one slot) to compare the time corresponding to the target timeline parameter value with the time corresponding to the capability parameter value of PDSCH reception processing for UE.

In step 203, transmitting a HARQ-ACK feedback indication information to the terminal to indicate a target sequence index value corresponding to the target timeline parameter value to the terminal.

In one embodiment, the target sequence index value is one of multiple sequence index values. When the base station transmits the HARQ-ACK feedback indication information to the terminal, the terminal can feed back HARQ-ACK based on the target timeline parameter value, and then in case of corresponding terminal capability, the terminal can completely receive downlink data prior to the timing unit length corresponding to the capability parameter value of PDSCH reception processing for UE and can feed back the HARQ-ACK information, and then the feedback timing of HARQ-ACK is effectively indicated when SCS is larger than 120 KHz.

In addition, in this embodiment, when the base station determines the target timeline parameter sequence when the terminal feeds back HARQ-ACK, the target timeline parameter sequence may be determined by any one of the following schemes and may be a first target timeline parameter sequence, a second target timeline parameter sequence, a third target timeline parameter sequence or a fourth target timeline parameter sequence.

Scheme 1: a timeline offset value for the terminal to feed back HARQ-ACK is obtained and a first target timeline parameter sequence is determined according to the timeline offset value and a first default timeline parameter sequence for HARQ-ACK.

In this scheme, the first target timeline parameter sequence may be determined as the target timeline parameter sequence, and each timeline parameter value in the first target timeline parameter sequence indicates the slot interval between the HARQ-ACK feedback slot and the last symbol of PDSCH.

In one embodiment, when the first target timeline parameter sequence is determined according to the timeline offset value and the first default timeline parameter sequence for HARQ-ACK, a sum of the timeline offset value and the first default timeline parameter sequence may be determined as the first target timeline parameter sequence. For example, if the range of timeline parameter values in the first default timeline parameter sequence is {1, 2, 3, 4, 5, 6, 7, 8}, a timeline offset value can be added on this basis to extend the default range.

In addition, the timeline offset value for the terminal to feed back HARQ-ACK may be obtained by any one of the following ways.

Way 1: a preset value is determined as the timeline offset value.

In one embodiment, a fixed value may be set by the protocol. For example, the timeline offset value may be set as $k\_d_u=5$ or $k\_d_u=8$. In one embodiment, the fixed value may be set by a higher layer message (broadcast message). By unifying the timeline offset value, the protocol formulation and implementation process are simplified.

Way 2: the timeline offset value is determined based on the target SCS value adopted by PDSCH for UE.

In this way, the timeline offset value may be correspondingly set for the target SCS; or, the timeline offset value may be calculated by the following formula based on the index value of the reference SCS value and the index value of the target SCS value:

$$k\_d_u \le z \times 2^{u-m};$$

where $k\_d_u$ denotes the timeline offset value, z denotes a positive integer, u denotes the index value of the target SCS value, and m denotes the index value of the reference SCS value.

Way 3: the timeline offset value is determined based on the capability parameter value of PDSCH reception processing for UE corresponding to the target SCS value adopted by PDSCH for UE.

In this way, the timeline offset value may be calculated by the following formula based on the capability parameter value of PDSCH reception processing for UE corresponding to the target SCS value:

$$k\_d_u \ge \lceil N1/L1 \rceil, \text{ or } k\_d_u \ge \lfloor N1/L \rfloor;$$

where, $k\_d_u$ denotes the timeline offset value, N1 denotes the capability parameter value of PDSCH reception processing for UE corresponding to the target SCS value, the capability parameter value of PDSCH reception processing for UE is expressed in terms of the number of symbols, and L denotes the number of symbols included in each slot.

It should be further noted that the timeline offset value may be a relative value for representing an effective slot, for example, the effective slot may refer to a slot including an uplink symbol.

Scheme 2: a timeline offset factor for the terminal to feed back HARQ-ACK is obtained, and a second target timeline parameter sequence is determined according to the first default timeline parameter sequence for HARQ-ACK and the timeline offset factor.

In this scheme, a second target timeline parameter sequence may be determined as the target timeline parameter sequence, and each timeline parameter value in the second target timeline parameter sequence indicates slot intervals between the HARQ-ACK feedback slot and the last symbol of PDSCH.

In one embodiment, when the second target timeline parameter sequence is determined according to the first default timeline parameter sequence for the HARQ-ACK and the timeline offset factor, a product of the timeline offset factor and the first default timeline parameter sequence may be determined as the second target timeline parameter sequence. For example, if the range of timeline parameter values in the first default timeline parameter sequence is {1, 2, 3, 4, 5, 6, 7, 8}, a timeline offset factor can be multiplied on this basis to extend the default range.

In addition, when the timeline offset factor for the terminal to feed back HARQ-ACK is obtained, a preset value may be determined as the timeline offset factor; or, the timeline offset factor may be determined based on the target SCS value adopted by PDSCH for UE.

In one embodiment, when the timeline offset factor is determined based on the target SCS value adopted by PDSCH for UE, the timeline offset factor may be set correspondingly for the target SCS value; or, the timeline offset factor can be obtained based on the index value of the reference SCS value and the index value of the target SCS value by the following formula:

$$k\_c_u = 2^{u-m}.$$

where $k\_c_u$ denotes the timeline offset factor, u denotes the index value of the target SCS value, and m denotes the index value of the reference SCS value.

Scheme 3: the second default timeline parameter sequence for HARQ-ACK is determined as a third target timeline parameter sequence.

In this scheme, the third target timeline parameter sequence may be used as the target timeline parameter sequence, and each timeline parameter value in the third target timeline parameter sequence indicates the i-th slot with PUCCH resource after the terminal receives PDSCH, where i is the corresponding timeline parameter value.

For example, if the timeline parameter value in the second default timeline parameter sequence is in the range of {1, 2, 3, 4, 5, 6, 7, 8}, when the timeline parameter value is 1 (corresponding to sequence index value 000), it means that HARQ-ACK is fed back on the 1st slot with PUCCH resource. By this way, the HARQ-ACK feedback slot is indicated by indicating the PUCCH slot, and the flexibility of system scheduling is increased.

Scheme 4: the first default timeline parameter sequence for HARQ-ACK is determined as a fourth target timeline parameter sequence, where each timeline parameter value in the fourth target timeline parameter sequence indicates the slot interval between the HARQ-ACK feedback slot and the last symbol of PDSCH.

In this scheme, the fourth target timeline parameter sequence may be used as the target timeline parameter sequence.

In one embodiment, in this scheme, when the default timeline parameter sequence k1={1, 2, 3, 4, 5, 6, 7, 8} in the traditional standard is used as the first default timeline parameter sequence, the fourth target timeline parameter sequence may be the second default timeline parameter sequence. The second default timeline parameter sequence may be agreed by an interface protocol of the base station and the terminal. For example, the second default timeline parameter sequence may be k1={4, 5, 6, 7, 8, 9, 10, 11}. The second default timeline parameter sequence may also be broadcasted to terminal via higher layer message, such as k1={n4, n5, n6, n7, n8, n9, n10, n11}. The time corresponding to all the k1 values broadcasted by the higher layer message is greater than the time of PDSCH reception processing at a reference SCS (e.g., values equal to or greater than (N1/14) slots, where N1 denotes the time of PDSCH reception processing), where the reference SCS may be 120 KHz, or may be the SCS scheduling PDSCH. In addition, when the second default timeline parameter sequence and the first default timeline parameter sequence are configured, the second default timeline parameter sequence is adopted when the SCS scheduling PDSCH is greater than a SCS (e.g., 120 KHz). Otherwise, the first default timeline parameter sequence is adopted.

It can be determined that the second default timeline parameter sequence is configured when new elements are added on the basis of the traditional first default timeline parameter sequence, and when the sequence values are mapped, start positions are different. For example, the traditional first default timeline parameter sequence is k1={1, 2, 3, 4, 5, 6, 7, 8}, and the first default timeline parameter sequence can be extended to a second default timeline parameter sequence k1={1, 2, 3, 4, 5, 6, 7, 8, 9, 10, 11, 12, 13, 14, 15, 16}. When the scheduled SCS is less than or equal to SCS1 (e.g., SCS1=120 KHz), the sequence index values start with 1 (000 corresponds to 1, 001 corresponds to 2, and so on), and when the scheduled SCS is greater than SCS1 and less than or equal to SCS2 (e.g., SCS1=120 KHz, SCS2=480 KHz), the sequence index values start with 2 (000 corresponds to 2, 001 corresponds to 3, and so on).

By this way, the target timeline parameter sequence is one of the first target timeline parameter sequence, the second target timeline parameter sequence, the third target timeline parameter sequence or the fourth target timeline parameter sequence, that is, the target timeline parameter sequence may be determined by any one of the above ways. Also, capability parameter value of PDSCH reception processing corresponding to reference SCS value is associated with the reference SCS, solutions of adding timeline offset value, timeline offset factor and indicating PUCCH timing resource are used, and the feedback timing of HARQ-ACK can be more effectively indicated by the base station. That is, the feedback timing of HARQ-ACK with a large indication range is indicated in case of minimizing the overhead, the scheduling flexibility of the base station is increased, the requirements of different services can be adapted, and the service perception of a user is improved. In addition, multiple HARQ-ACK can be multiplexed together for transmission while the HARQ-ACK timing indication is in a larger range, and the power consumption of the terminal is reduced.

In addition, on the basis of the above embodiments, the base station transmits HARQ-ACK feedback indication information to the terminal by the following ways.

Way 1: when the target timeline parameter sequence is the third target timeline parameter sequence or the fourth target timeline parameter sequence, a first control signaling is transmitted to the terminal, where the first control signaling carries a first target sequence index value, the first target sequence index value is one of multiple sequence index values, and a timeline parameter value corresponding to the first target sequence index value is a target timeline parameter value.

That is, when the target timeline parameter sequence is the first default timeline parameter sequence or the second default timeline parameter sequence, the base station may directly indicate the target sequence index value corresponding to the target timeline parameter value to the terminal, and then the terminal may obtain the target timeline parameter value directly based on the target timeline index value.

Way 2: when the target timeline parameter sequence is the first target timeline parameter sequence, a second control signaling is transmitted to the terminal and a higher layer signaling is transmitted to the terminal, where the second control signaling carries a second target sequence index value, the higher layer signaling carries a timeline offset value, and the second target sequence index value is one of multiple sequence index values.

That is, when the target timeline parameter sequence consists of the first default timeline parameter sequence and the timeline offset value, the target timeline parameter value may be indirectly indicated to the terminal. For a specific process, reference may be made to related contents at the terminal side, which is not described herein again.

Way 3, when the target timeline parameter sequence is the second target timeline parameter sequence, a second control signaling is transmitted to the terminal and a higher layer signaling is transmitted to the terminal, where the second control signaling carries a third target sequence index value, the higher layer signaling carries a timeline offset factor, and the third target sequence index value is one of multiple sequence index values.

That is, when the target timeline parameter sequence consists of the first default timeline parameter sequence and the timeline offset factor, the target timeline parameter value may be indirectly indicated to the terminal. For a specific process, reference may be made to related contents at the terminal side, which is not described herein again.

The embodiments of the present application are specifically described below by way of specific examples.

Embodiment 1

In step 1, PDSCH reception processing timing parameter is defined, that is, capability parameter value N1 of PDSCH reception processing for UE is defined.

When u=3 and SCS=120 KHz, N1 has values of 20 symbols and 24 symbols, and when SCS is greater than 120 KHz, there are some cases as follows.

If the target SCS adopted by the PDSCH for UE is 240 KHz and u=4, the symbol length of N1 is ½ times of the symbol length of SCS=120 KHz, that is, $N1_4=2N1_3$; if the target SCS value adopted by the PDSCH is 480 KHz and u=5, the symbol length at this timing is ¼ times of the symbol length of SCS=120 KHz, that is, $N1_5=4N1_3$; and if the target SCS value adopted by the PDSCH is 240 KHz and u=6, the symbol length at this timing is ⅛ times of the symbol length of SCS=120 KHz, that is, $N1_6=8N1_3$. The specific capability parameter values of PDSCH reception processing for UE can be referred to Table 1 above.

Namely, the capability parameter value of PDSCH reception processing for UE is $N1_u=N1_m \times 2^{u-m}$, where $N1_u$ denotes the capability parameter value of PDSCH reception processing for UE, $N1_m$ denotes the capability parameter value of PDSCH reception processing corresponding to the reference SCS value, u denotes the index value of the target SCS value adopted by the PDSCH, and m denotes the index value of the reference SCS value. The reference SCS value in the present embodiment is 120 KHz.

In addition, in this step, when the capability parameter value of PDSCH reception processing for UE is indicated, it may be indicated in the interface protocol using a definite value, and may also be indicated by reporting a capability parameter through the terminal, that is, the terminal reports the capability parameter value N1 of PDSCH reception processing for UE to the base station.

It should be noted that, the unit of the capability parameter value of PDSCH reception processing for UE may be a symbol or a slot, which is not limited herein.

Step 2, the base station determines the value range of the target timeline parameter sequence k1, and the time corresponding to at least one value in the value sequence k1 is longer than the time corresponding to N1.

In one embodiment, a timeline offset value may be added to the first default timeline parameter sequence to obtain the target timeline parameter sequence k1. In the following description, the timeline offset value $k\_d_u=5$ will be taken as an example to illustrate.

In one embodiment, the timeline parameter value in the target timeline parameter sequence denotes an interval between a feedback symbol of HARQ-ACK and a last symbol of PDSCH. It is assumed that SCS=960 KHz, in case of capability parameter value N1 of PDSCH reception processing=160 symbols, the terminal receives the scheduling signaling and PDSCHs at slot 0, and the terminal needs to complete the PDSCH reception in 11.2(N1/14=11.2) slots, that is, HARQ-ACK can be fed back only after 11.2 slots, and HARQ-ACK timing indicated by the base station is greater than 11, and at least k1=12 or k1=13 can be used for effective indication.

Ways for determining the timeline offset value are described as follows.

Way A: a fixed value is set by the protocol, for example, $k\_d_u$=5 and $k\_d_u$=8 are set. Or, the fixed value may be set by a higher layer message (broadcast message). By unifying the timeline offset value, the protocol formulation and implementation process are simplified.

Way B: a fixed value is set as the timeline offset value by the protocol, and is associated with a specific value of the target SCS adopted by the PDSCH.

For example, $k\_d_u \geq z \times 2^{u-m}$, where u is the index value of the target SCS and z denotes a positive integer, e.g., z=1 or z=2, and then when SCS=240 KHz, the timeline offset is 2; when SCS=480 KHz, the timeline offset is 4; and when SCS=960 KHz, the timeline offset is 8.

For another example, a timeline offset value is directly set for the corresponding target SCS. For example, when SCS=240 KHz, the timeline offset is 2; when SCS=480 KHz, the timeline offset is 4; when SCS=960 KHz, the timeline offset is 7; and when SCS=1920 KHz, the timeline offset is 10.

By this way, when the SCS is greater than 120 KHz, the timeline offset is associated with the SCS, which increases the effective range of the indication.

Way C: a fixed value is set and is associated with the capability parameter value N1 of PDSCH reception processing corresponding to the target SCS value.

For example, $k\_d_u \geq \lfloor N1/L \rfloor$, where N1 is the capability parameter value of PDSCH reception processing for UE corresponding to the target SCS value, the capability parameter value of PDSCH reception processing for UE is denoted by the number of symbols, and L denotes the number of symbols included in each slot. By taking into account the delay of PDSCH reception, the effective indication range of k1 is further rationalized.

For example, when SCS=240 KHz and it is assumed that N1=34 symbols, $k\_d_u=\lfloor 34/14 \rfloor=2$ slots (N1 is divided by 14 and rounded down); for another example, when SCS=480 KHz and it is assumed that N1=44 symbols, $k\_d_u=\lfloor 44/14 \rfloor=3$ slots; for another example, when SCS=960 KHz and it is assumed that N1=56 symbols, $k\_d_u=\lfloor 56/14 \rfloor=4$ slots.

It should be noted that, in order to simplify protocol formulation, the value of N1 is a value obtained when DMRS is configured.

Step 3, the base station transmits HARQ-ACK feedback timing indication information for scheduling downlink data.

When scheduling downlink data, the base station simultaneously transmits the HARQ-ACK feedback timing indication information, and the indication information indicates one value among values of k1. The HARQ-ACK feedback timing interval indicated by k1 is not less than the value of the corresponding N1.

Further, if the HARQ-ACK feedback timing determined in step 2 is the sum of the timeline offset value and the first default timeline parameter sequence, that is, k1=default k1+$k\_d_u$, it can be indicated by the following two ways.

Way 1, the k1 value is defined directly, e.g. when the SCS is larger than 960 KHz, k1={5, 6, 7, 8, 9, 10, 11, 12} and the value of k1 is indicated by the control signaling (e.g. PDSCH-to-HARQ_feedback timing indicator representing HARQ-ACK feedback timing).

In an example, the specific content of PDSCH-to-HARQ_feedback timing can be shown in the following Table 4.

TABLE 4

| Target timeline parameter sequence (sequence index value) (PDSCH-to-HARQ_feedback timing) | Timeline parameter value | Feedback slot (n is the PDSCH reception slot.) |
|---|---|---|
| 000 | 5 | 5 + n |
| 001 | 6 | 6 + n |
| 010 | 7 | 7 + n |
| 011 | 8 | 8 + n |
| 100 | 9 | 9 + n |
| 101 | 10 | 10 + n |
| 110 | 11 | 11 + n |
| 111 | 12 | 12 + n |

Way 2, the timeline offset value $k\_d_u$ is determined by higher layer signaling or protocol, and a default value of k1 is indicated by control signaling (e.g., PDSCH-to-HARQ_feedback timing indicator representing HARQ-ACK feedback timing).

It is assumed that the value of $k\_d_u$ configured by the higher layer signaling is 4, the default value of k1 indicated in the control signaling and the application can be shown in the following Table 5.

TABLE 5

| First default timeline parameter sequence (sequence index value) (PDSCH-to-HARQ_feedback timing) | Timeline parameter value | Feedback slot (n is the PDSCH reception slot) |
|---|---|---|
| 000 | 1 | 4 + 1 + n |
| 001 | 2 | 4 + 2 + n |
| 010 | 3 | 4 + 3 + n |
| 011 | 4 | 4 + 4 + n |
| 100 | 5 | 4 + 5 + n |
| 101 | 6 | 4 + 6 + n |
| 110 | 7 | 4 + 7 + n |
| 111 | 8 | 4 + 8 + n |

That is, when the HARQ-ACK feedback timing is indicated by two parts, that is, when the default value of k1 is indicated by scheduling signaling and $k\_d_u$ is configured by higher layer signaling or protocol, the HARQ-ACK feedback timing is indicated by k1 and $k\_d_u$ jointly. $k\_d_u$ may be an absolute value and k1 may be a relative value. The absolute value here means that the counting is performed according to the slot number, and both the uplink slot and the downlink slot are included. The relative value is calculated only for valid slots, e.g. only for slots including uplink symbols.

Figure 3:
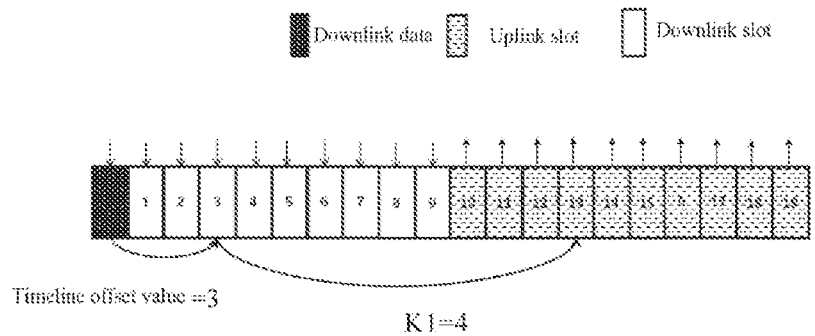
FIG. 3 is a first schematic diagram of embodiment 1 of the present application.
Figure 4:
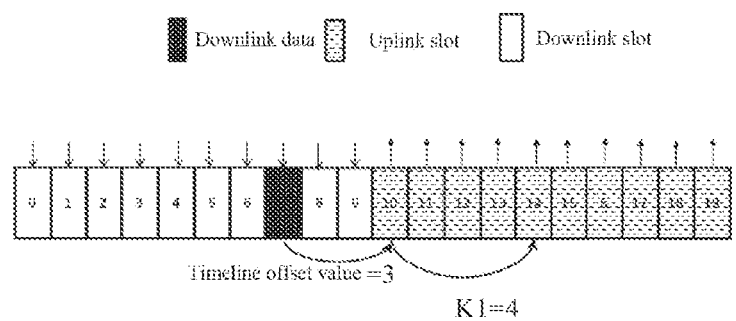
FIG. 4 is a second schematic diagram of embodiment 1 of the present application.

For example, it is assumed that, among 20 slots, slots 0 to 9 are downlink slots and slots 10 to 19 are uplink slots, and it is assumed that $k\_d_u$ is 3. As shown in FIG. 3, there is downlink data scheduling on slot 0, k1 indicates 4, then $k\_d_u$ corresponds to slot 3, and k1=4 valid uplink slots are counted from slot 3 to slot 13, and actual feedback of HARQ-ACK occurs at uplink slot 13. For another example, as shown in FIG. 4, when downlink data scheduling is performed on slot 7, and the target timeline parameter value k1 indicates 4, the timeline offset value $k\_d_u$ corresponds to slot 10, and k1=4 valid uplink slots are counted from slot 10 to slot 14, and actual feedback of HARQ-ACK occurs in uplink slot 14.

By this way, the processing capability for UE is embodied in a manner of setting $k\_d_u$, to reduce the invalid indication range; in addition, k1 enables more flexible configuration of uplink and downlink slots by only calculating the valid uplink slots.

Embodiment 2

Step 1, PDSCH reception processing timing parameter is defined, that is, capability parameter value N1 of PDSCH reception processing is defined.

When u=3, SCS=120 KHz, and N1 has values of 20 symbols and 24 symbols, and when SCS is greater than 120 KHz, there are the following cases.

If the target SCS adopted by the PDSCH for UE is 240 KHz, u=4, the symbol length of N1 is ½ times of the symbol length of SCS=120 KHz, that is, $N1_4=(N1_3-D)\times 2$; if the target SCS value adopted by the PDSCH is 480 KHz, u=5, the symbol length at this timing is ¼ times of the symbol length of SCS=120 KHz, that is $(N1_3-D)\times 4$; if the target SCS value adopted by the PDSCH is 240 KHz, u=6, the symbol length at this timing is ⅛ times of the symbol length of SCS=120 KHz, that is, $N1_6=(N1_3-D)\times 8$. The specific capability parameter value of PDSCH reception processing for UE can be shown from Table 2 above.

That is, the capability parameter value of PDSCH reception processing for UE is $N1_u=(N1_m-D)\times 2^{u-m}$; where, $N1_u$ denotes the capability parameter value of PDSCH reception processing for UE, $N1_m$ denotes the capability parameter value of PDSCH reception processing for UE corresponding to the reference SCS value, D denotes a preset time offset value, u denotes the index value of the target SCS value adopted by the PDSCH, and m denotes the index value of the reference SCS value. The reference SCS value in the present embodiment is 120 KHz.

In addition, in this step, when the capability parameter value of PDSCH reception processing for UE is indicated, it can be indicated in an interface protocol using a definite value, and may also be indicated by reporting a capability parameter through the terminal, that is, the terminal reports the capability parameter value N1 of PDSCH reception processing for UE to the base station.

Further, the value of D can be $N1_m/3$. In one embodiment, the process of receiving PDSCH by the terminal includes 4 parts: control channel reception (channel estimation and channel blind detection), data channel estimation, data demodulation, data channel decoding, HARQ-ACK packet feedback (this part takes less timing and is ignored here), the computation amount and channel bandwidth (the number of scheduled PRBs), the number of MIMO layers and the size of transport data block. When the communication frequency exceeds 52.6 GHz, the number of MIMO layers is small, such as not greater than two, and when the communication frequency is less than 52.6 GHz, the number of MIMO layers will increase with a probability of 4, and when the communication frequency exceeds 52.6 GHz, the modulation order may be limited, and then the total decoding timing is reduced. To simplify the calculation, D can be ⅓ times of NL. The capability parameter value of PDSCH reception processing for UE at this timing can be as shown in Table 2 above.

It should be noted that, when parameters such as the number of MIMO layers, the number of PRBs, the transport block size of the scheduled data are the same as SCS=120 KHz or do not consider the difference of the two, the preset time offset value may be a negative value, which is equivalent to adding a value of an offset.

Step 2, the base station determines the value range of the target timeline parameter sequence k1, where the time corresponding to at least one value in the value sequence k1 is greater than the time corresponding to N1.

In one embodiment, the target timeline parameter sequence k1 can be obtained by multiplying a timeline offset factor by the first default timeline parameter sequence. The following description will take the timeline offset factor $k\_c_u=2$ as an example to illustrate.

For example, when SCS=960 KHz, the demodulation timing of PDSCH is N1/14=12.14 slots, and if it is assumed that PDSCH is received at slot=0, after multiplying k1 by the timeline offset factor, k1=14 and k1=16 are valid indication.

The timeline offset factor $k\_c_u$ is determined by the following ways.

Way A: a fixed value is set by the protocol. For example, $k\_c_u=2$ or $k\_d_c=4$. Or, the fixed value is set by a higher layer message (broadcast message). By unifying the timeline offset value, the protocol formulation and implementation process are simplified.

Way B: a fixed value is set by the protocol as the timeline offset factor, which is associated with the specific value of the target SCS adopted by PDSCH.

For example, $k\_c_u=2^{u-m}$, where $k\_c_u$ denotes the timeline offset factor, u is the index value of the target SCS, m denotes the index value of the reference SCS value, and when SCS=240 KHz, the timeline offset factor is 2; when SCS=480 KHz, the timeline offset factor is 4; and when SCS=%0 KHz, the timeline offset factor is 8.

For another example, the timeline offset factor is directly set correspondingly for the target SCS. For example, when SCS=240 KHz, the timeline offset factor is 2; when SCS=480 KHz, the timeline offset factor is 2.5; when SCS=960 KHz, the timeline offset factor is 3; and when SCS=1920 KHz, the timeline offset factor is 3.5.

In an embodiment, the value of the timeline offset factor in this step may also be configured by a higher layer protocol.

By this configuration, when the SCS is greater than 120 KHz, the timeline offset factor is associated with the SCS, which increases the effective range of the indication.

Step 3, the base station transmits HARQ-ACK feedback timing indication information for scheduling downlink data.

When scheduling downlink data, the base station simultaneously transmits the indication information of the HARQ-ACK feedback timing, and the indication information indicates one value among values of k1. The HARQ-ACK feedback timing interval indicated by k1 is not less than the value of the corresponding N1.

In addition, if the HARQ-ACK feedback timing determined in step 2 is the product of the timeline offset factor and the first default timeline parameter sequence, the HARQ-ACK feedback timing may be indicated by the following two ways.

Way 1, values of k1 are defined directly. e.g. when the SCS is greater than 960 KHz, k1={2, 4, 6, 8, 10, 12, 14, 16}, values of k1 are indicated by the control signaling (e.g. PDSCH-to-HARQ_feedback timing indicator representing HARQ-ACK feedback timing).

For example, the specific content of PDSCH-to-HARQ_feedback timing can be shown in the following Table 6.

TABLE 6

| Target timeline parameter sequence (sequence index value) (PDSCH-to-HARQ_feedback timing) | Timeline parameter value | Feedback slot (n is the PDSCH reception slot) |
|---|---|---|
| 000 | 2 | 2 + n |
| 001 | 4 | 4 + n |
| 010 | 6 | 6 + n |
| 011 | 8 | 8 + n |
| 100 | 10 | 10 + n |
| 101 | 12 | 12 + n |
| 110 | 14 | 14 + n |
| 111 | 16 | 16 + n |

In the above Table, when defining the value range of the k1, the protocol may define a specific value, and the terminal directly indexes the corresponding HARQ-ACK feedback timing according to the indication of the control signaling.

Way 2, the timeline offset factor is determined by higher layer signaling or a protocol, and it is default that k1 is indicated by control signaling (e.g., PDSCH-to-HARQ feedback timing indicator representing HARQ-ACK feedback timing).

It is assumed that the higher layer signaling configures that the value of $k\_c_u$ is 2, and then the default value of k1 indicated in the control signaling and the application can be as shown in Table 7 below.

TABLE 7

| First default timeline parameter sequence (sequence index value) (PDSCH-to-HARQ_feedback timing) | Timeline parameter value | Feedback slot (n is the PDSCH reception slot) |
|---|---|---|
| 000 | 1 | 2 * 1 + n |
| 001 | 2 | 2 * 2 + n |
| 010 | 3 | 2 * 3 + n |
| 011 | 4 | 2 * 4 + n |
| 100 | 5 | 2 * 5 + n |
| 101 | 6 | 2 * 6 + n |
| 110 | 7 | 2 * 7 + n |
| 111 | 8 | 2 * 8 + n |

In the above table, when the protocol defines a value range of k1, the timeline parameter value in the first default timeline parameter sequence is {1, 2, 3, 4, 5, 6, 7, 8}, the terminal directly indexes a corresponding value according to the indication of the control signaling, and multiplies the timeline offset factor by the value, and then the obtained final value is the HARQ-ACK feedback timing.

The setting mode enables the timeline offset factor to be based on the unit that the slot of the reference SCS value embodies the terminal length, that is, there is only one HARQ-ACK feedback point in 0.125 ms, the timer setting of R15 is reused, and the timing complexity of a transmitting processor is reduced.

Embodiment 3

Step 1, PDSCH reception processing timing parameter is defined, that is, capability parameter value N1 of PDSCH reception processing is defined.

When u=3, SCS=120 KHz, and N1 has values of 20 symbols and 24 symbols, and when SCS is greater than 120 KHz, the PDSCH reception processing timing parameter, that is, the capability parameter value of PDSCH reception processing for UE, is defined for each SCS respectively as follows.

If the target SCS value adopted by the PDSCH for UE is 240 KHz and u=4, the symbol length is ½ times of the symbol length of SCS=120 KHz, and the range of the capability parameter value (denoted by N1) of PDSCH reception processing for UE is $N1_3 \leq N1_4 \leq N1_3$.

If the target SCS value adopted by the PDSCH for UE is 480 KHz and u=5, the symbol length at this timing is ½ times of the symbol length of SCS=120 KHz, and the range of the capability parameter value of PDSCH reception processing for UE is $N1_4 \leq N1_5 \leq 2N1_4$.

If the target SCS value adopted by the PDSCH for UE is 960 KHz and u=6, the symbol length at this timing is ½ times of the symbol length of SCS=120 KHz, and the range of the capability parameter value of PDSCH reception processing for UE is $N1_5 \leq N1_6 \leq 2N1_5$. The corresponding capability parameter value of PDSCH reception processing for UE at this timing is as shown in Table 3.

Step 2, the base station determines the value range of the target timeline parameter sequence k1, and then the timing corresponding to at least one value in the value sequence k1 is greater than the time corresponding to N1.

In an indirect manner, the value of k1 is configured. That is, when an uplink feedback channel is configured, timing information is added, that is, when a physical uplink control channel (Physical Uplink Control Channel, PUCCH) is configured, a period information is added. In data scheduling, the k1-th slot with PUCCH resource is indexed after the terminal receives PDSCH, namely the latest k1-th PUCCH resource according to the HARQ-ACK feedback indication information, at least one slot where the PUCCH resource among the indexed PUCCH resources is located is greater than the time corresponding to N1.

The related design is as follows: the PUCCH configuration contains period timing information, and the configuration information field includes the following: field 1: PUCCH format: indicating which format of PUCCH is used; field 2: the number of symbols of the PUCCH; field 3: the location of the first symbol of the PUCCH; field 4: frequency domain information (number of PRBs and offset location) occupied by PUCCH; and field 5: the period information (period T, offset) of the PUCCH.

It should be noted that, in the field 4, when the number of PRBs in some PUCCH formats is 1, the number of PRBs may not be configured. The unit of the period T in the field 5 may be the number of slots, and the offset may be the number of slots.

For example, when PUCCH resource is configured. PUCCH period information including a period T and an offset is carried. T=4, offset=1; that is, the slot with the PUCCH resource may be: 1, 5, 9, 14 . . . , etc., and PUCCH resource is configured when the slot number satisfies (s-offset) % 4=0.

Step 3, the base station transmits HARQ-ACK feedback timing indication information for scheduling downlink data.

When scheduling downlink data, the base station simultaneously transmits the HARQ-ACK feedback timing indication information, and the indication information indicates one value of the values of k1. The terminal calculates a corresponding slot with PUCCH resource by using the value, and the slot corresponds to the HARQ-ACK feedback timing.

For example, when the terminal receives the PDSCH data scheduled by the base station, the PDSCH data includes a HARQ-ACK feedback timing information indication, such as a value k1 indicated by a PDSCH-to-HARQ_feedback timing indicator. The interpretation of this field is redefined.

For example, when k1=1 (e.g., bit information is 000), it indicates that HARQ-ACK is fed back on the 1st slot with PUCCH resource, when k1=2 (e.g., bit information is 001), it indicates that the HARQ-ACK is fed back on the 2nd slot with PUCCH resource; and when k1=3 (e.g. bit information is 010), it indicates that HARQ-ACK is fed back on the 3rd slot with PUCCH resource, and so on.

The effects of the present embodiment will be illustrated by taking k1=1/2/3 as an example below.

Figure 5:
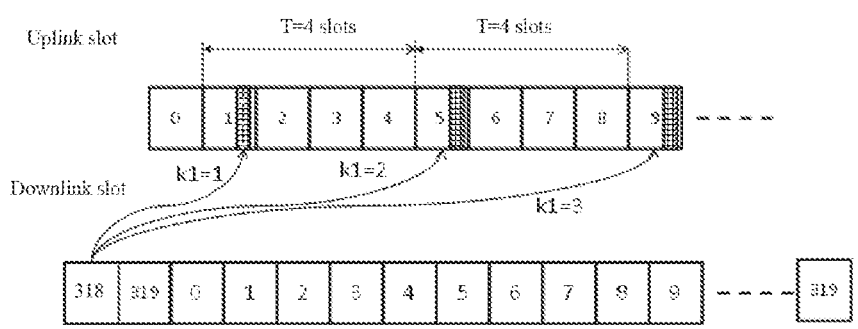
FIG. 5 is a schematic diagram of embodiment 3 of the present application.

As shown in FIG. 5, in PDSCH data scheduling, the base station indicates the slot location when the terminal feeds back the HARQ-ACK. It is assumed that the period T of configured PUCCH is 4 and the offset thereof is 1, referring to FIG. 5, there is PUCCH configuration information on slots 1,5 and 9, etc. PDSCH data is transmitted on slot 318 of the last radio frame if the HARQ-ACK feedback timing indicated by k1 is counted according to the slots configured with PUCCH resource. If k1 is 1, HARQ-ACK is fed back on the slot 1; if k1 is 2, HARQ-ACK is fed back on slot 5; and if k1 is 3, HARQ-ACK is fed back on slot 9.

When the PUCCH resource is configured, an aperiodic configuration method may be adopted, for example, a bitmap is used to indicate which sub-frames have PUCCH resource in a timing period (for example, 10 ms), and a slot indication method having PUCCH effective resource is still adopted when the HARQ-ACK feedback slot position is indicated. In addition, for the timing division duplex configuration, the slot number including the downlink symbol may be removed from the slot with the effective PUCCH resource.

By this way, the periodic or aperiodic PUCCH resources are configured, the HARQ-ACK feedback timing indicated by the signaling is configured, the flexibility of system scheduling is increased according to the method for indicating the effective PUCCH slot, and the HARQ-ACK feedback for any SCS and any PDSCH reception processing capability can be well realized. In addition, the effective PUCCH slot herein may refer to: the slot in which the PUCCH resource is configured according to the PUCCH configuration information, or a slot that is only an uplink slot and includes PUCCH configuration information.

It should be noted that this embodiment may also be applied to scheduling of uplink PUSCH, that is, when scheduling uplink PUSCH, the accurate minimum timing for PUSCH transmission may be determined, and then when the PUSCH transmission is scheduled, information of a PUSCH transmission slot is indicated in control signaling, where a protocol is denoted by k2, and the indication related to k2 includes two types: one is a default value configured by the protocol, and the other is a parameter configured by a higher layer, and a specific scheduling process may be referred to in this embodiment.

The problem of indicating the HARQ scheduling with SCS greater than 120 KHz can be solved by the embodiments of the present application, the base station schedules data more flexibly and the k1 indication is more effective.

Figure 6:
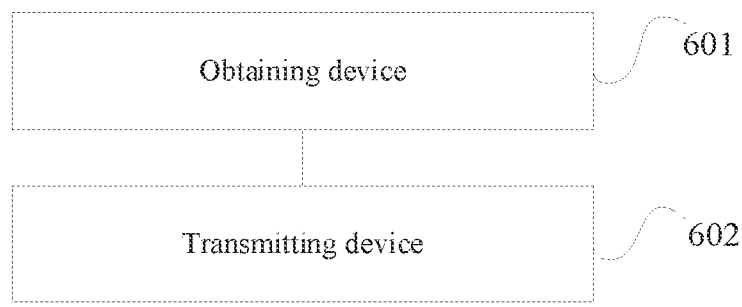
FIG. 6 is a diagram of an HARQ-ACK feedback device applied to a terminal according to an embodiment of the present application.

Referring to FIG. 6 showing a device diagram of an HARQ feedback device applied to a terminal in this embodiment, the device includes: an obtaining device 601, configured to obtain a target timeline parameter value for indicating a timing at which the terminal feeds back hybrid automatic repeat request-acknowledgement (Hybrid Automatic Repeat Request-Acknowledgement HARQ-ACK); and a target timeline parameter sequence is predefined between the terminal and a base station, and the target timeline parameter sequence includes multiple sequence index values and multiple timeline parameter values which have one-to-one correspondence; the timeline parameter value indicates slot intervals between a HARQ-ACK feedback slot and a last symbol of physical downlink shared channel (Physical Downlink Shared Channel, PDSCH), or the timeline parameter value indicates a slot where physical uplink control channel (Physical Uplink Control Channel, PUCCH) resource is located and the slot where the PUCCH resource is located corresponds to the HARQ-ACK feedback slot; and the target timeline parameter value is one of multiple timeline parameter values, and a time corresponding to the target timeline parameter value is equal to or greater than a time corresponding to a capability parameter value of PDSCH reception processing for UE; and a transmitting device 602, configured to feed back the HARQ-ACK to the base station on the slot corresponding to the target timeline parameter value.

It should be noted that the device can implement all the method steps of the terminal side method embodiment, and can realize the same effect, which is not described herein again.

Figure 7:
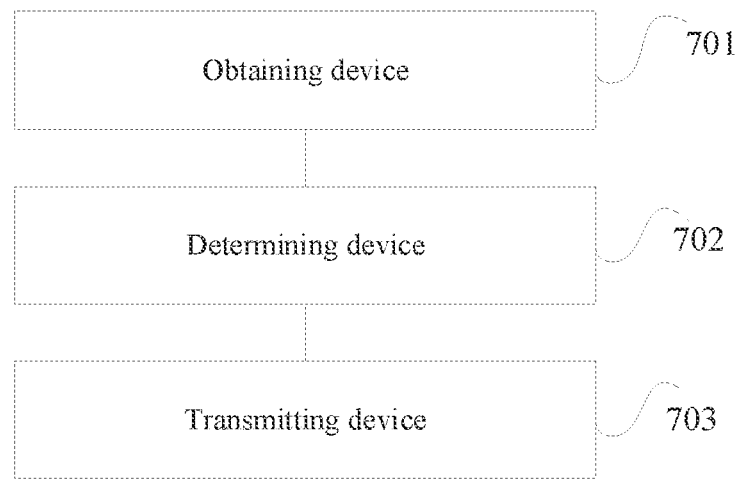
FIG. 7 is a diagram of an HARQ-ACK feedback device applied to a base station according to an embodiment of the present application.

Referring to FIG. 7 showing a device diagram of an HARQ feedback device applied to a base station in the embodiment of the present application, where the device includes: an obtaining device 701, configured to obtain a capability parameter value of PDSCH reception processing for UE; a determining device 702, configured to determine a target timeline parameter sequence for the terminal to feed back an HARQ-ACK, where the target timeline parameter sequence has one-to-one correspondences between multiple sequence index values and multiple timeline parameter values; each timeline parameter value indicates slot intervals between a HARQ-ACK feedback slot and a last symbol of the PDSCH, or the timeline parameter value indicates a slot where a PUCCH resource is located and the slot where the PUCCH resource is located corresponds to the HARQ-ACK feedback slot; and a time corresponding to one or more timeline parameter values in the target timeline parameter sequence is equal to or greater than a time corresponding to a capability parameter value of PDSCH reception processing for UE; and a transmitting device 703, configured to transmit HARQ-ACK feedback indication information to the terminal, to indicate a target sequence index value corresponding to a target timeline parameter value to the terminal, and the target sequence index value is one of multiple sequence index values.

It should be noted that the device can implement all the method steps of the method embodiment at the base station side, and can realize the same effect, and details are not described herein again.

Figure 8:
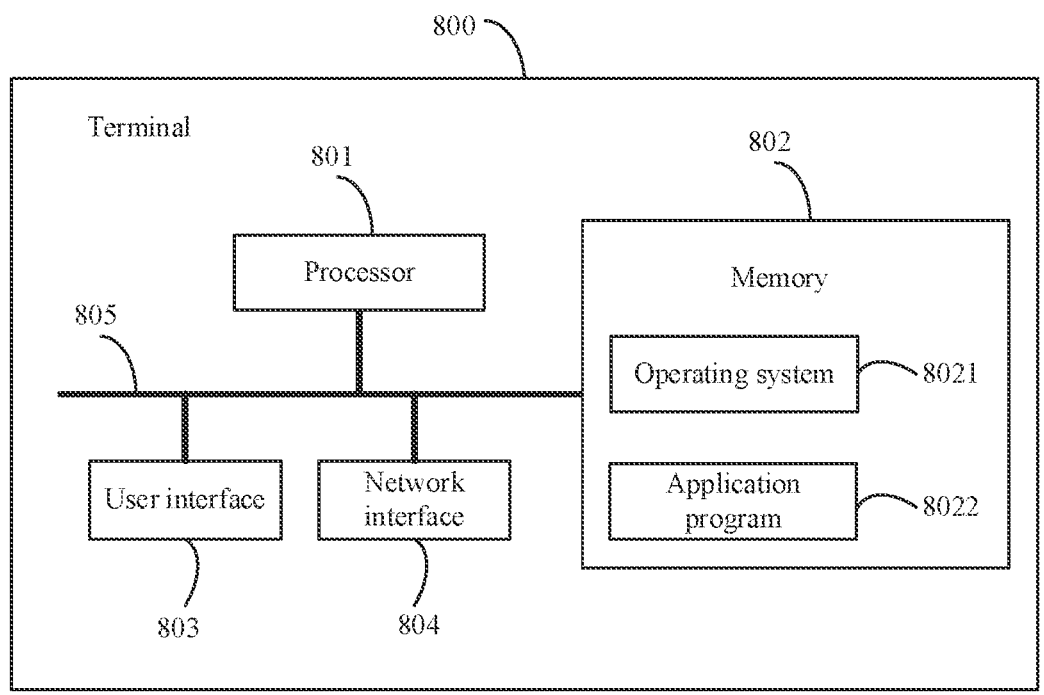
FIG. 8 is a first schematic structural diagram of a terminal according to an embodiment of the present application.

FIG. 8 is a schematic structural diagram of a terminal according to an embodiment of the present application, and as shown in FIG. 8, the terminal 800 may include: at least one processor 801, memory 802, at least one network interface 804, and other user interfaces 803. The various components in terminal 800 are coupled together by a bus system 805. The bus system 805 is used to enable connection and communication between the components. The bus system 805 includes a power bus, a control bus and a status signal bus in addition to a data bus. For clarity of illustration, the various buses are labeled as bus system 805 in FIG. 8.

The user interface 803 may include a display, a keyboard, or a pointing device, such as a mouse, trackball, touch pad, or touch screen.

In an embodiment, the memory 802 in the embodiments of the present application can be either volatile memory or nonvolatile memory, or can include both volatile and non-volatile memory. The non-volatile memory may be a read-only memory (Read-Only Memory ROM), a programmable ROM (Programmable ROM, PROM), an erasable PROM (Erasable PROME, PROM), an electrically erasable PROM (Electrically Erasable PROM, EEPROM), or a flash memory. The volatile memory may be a random access memory (Random Access Memory, RAM) which serves as an external cache. By way of example, and not limitation, many forms of RAM are available, such as static random access memory (Static Random Access Memory, SRAM), a dynamic random access memory (Dynamic Random Access Memory, DRAM), a synchronous dynamic random access memory (Synchronous Dynamic Random Access Memory, SDRAM), a double data rate synchronous dynamic random access memory (Double Data Rate Synchronous Dynamic Random Access Memory, DDRSDRAM), enhanced synchronous SDRAM (Enhanced Synchronous SDRAM, ESDRAM), synchronous link DRAM (Synchronous Link DRAM, SLDRAM), and direct Rambus RAM (Direct Rambus RAM, DRRAM). The memory 802 of the systems and methods described in the various embodiments herein is intended to include, without being limited to, these and any other suitable types of memory.

In some embodiments, memory 802 stores elements, executable devices or data structures, or a subset thereof, or an expanded set thereof, for example: operating system 8021 and application programs 8022.

The operating system 8021 includes various system programs, such as a framework layer, a core library layer, a driver layer, and the like, and is used to implement various basic services and process hardware-based tasks. The application 8022 includes various applications, such as a media player (Media Player), a browser (Browser), and the like, for implementing various application services. A program implementing the method of the embodiments of the present application may be included in application program 8022.

In this embodiment, by calling a computer program or instruction stored in the memory 802, a computer program or instruction stored in the application program 8022, the processor 801 is configured to: obtain a target timeline parameter value for indicating a timing at which the terminal feeds back HARQ-ACK; where a target timeline parameter sequence is predefined between the terminal and a base station, and the target timeline parameter sequence includes multiple sequence index values and multiple timeline parameter values which have one-to-one correspondence; the timeline parameter value indicates slot intervals between a HARQ-ACK feedback slot and the last symbol of the PDSCH, or the timeline parameter value indicates a slot where a PUCCH resource is located and the slot where the PUCCH resource is located corresponds to the HARQ-ACK feedback slot; and the target timeline parameter value is one of multiple timeline parameter values, and a time corresponding to the target timeline parameter value is equal to or greater than a timing corresponding to a capability parameter value of PDSCH reception processing for UE; and to feed back the HARQ-ACK to the base station on the slot corresponding to the target timeline parameter value.

The method disclosed in the embodiments of the present application may be applied to the processor 801 or implemented by the processor 801. The processor 801 may be an integrated circuit chip having signal processing capabilities. In implementation, the steps of the above method may be performed by instructions in the form of hardware integrated logic circuits or software in the processor 801. The processor 801 may be a general purpose processor, a digital signal processor (Digital Signal Processor, DSP), an application specific integrated circuit (Application Specific Integrated Circuit, ASIC), a field programmable gate array (Feld Programmable Gate Array, FPGA) or other programmable logic device, discrete gate or transistor logic, or discrete hardware components. The various methods, steps, and logic blocks disclosed in the embodiments of the present application may be implemented or performed. A general purpose processor may be a microprocessor or the processor may be any conventional processor or the like. The steps of the method disclosed in connection with the embodiments of the present application may be directly implemented by a hardware decoding processor, or implemented by a combination of hardware and software modules in the decoding processor. The software modules may be located in RAM, flash, ROM, PROM, or EPROM, registers, and other storage media in the related art. The storage medium is located in a memory 802, and the processor 801 reads the information in the memory 802, and completes the steps of the method in combination with the hardware.

It should be noted that the embodiments described herein may be implemented by hardware, software, firmware, middleware, microcode, or a combination thereof. For a hardware implementation, the processing unit may be implemented within one or more application specific integrated circuits (Application Specific Integrated Circuits, ASICs), digital signal processors (Digital Signal Processors, DSPs), digital signal processing devices (Digital Signal Processing Devices, DSPDs), programmable logic devices (Programmable Logic Devices, PLDs), field programmable gate arrays (Field Programmable Gate Arrays, FPGAs), general purpose processors, controllers, micro-controllers, microprocessors and other electronic units or a combination thereof for performing the functions described in the present application.

For a software implementation, the techniques described may be implemented with modules (e.g., procedures, functions, and so on) that perform the functions described in the embodiments of the application. The software codes may be stored in a memory and executed by a processor. The memory may be implemented inside the processor or outside the processor.

In an embodiment, the processor 801 is further configured to perform any one of the following steps of:
when the target timeline parameter sequence is a first default timeline parameter sequence or a second default timeline parameter sequence, receiving a first control signaling sent by the base station, where the first control signaling carries a first target sequence index value, the first target sequence index value is one of multiple sequence index values, and a timeline parameter value corresponding to the first target sequence index value is the target timeline parameter value; when the target timeline parameter sequence is the second default timeline parameter sequence, each timeline parameter value in the target timeline parameter sequence indicates the i-th slot with PUCCH resource after the terminal receives the PDSCH, and i is a corresponding timeline parameter value; and when the target timeline parameter sequence is the first default timeline parameter sequence, each timeline parameter value in the target timeline parameter sequence indicates the slot interval between the HARQ-ACK feedback slot and the last symbol of the PDSCH:
when the target timeline parameter sequence consists of the first default timeline parameter sequence and a timeline offset value, receiving a second control signaling sent by the base station and receiving a higher layer signaling sent by the base station, or receiving the second control signaling sent by the base station and obtaining the timeline offset value predefined by a protocol; where the second control signaling carries a second target sequence index value, and the higher layer signaling carries the timeline offset value; the second target sequence index value is one of multiple sequence index values, a sum of a target default parameter value corresponding to the second target sequence index value and the timeline offset value is the target timeline parameter value, and the target default parameter value is one of the first default timeline parameter sequence; and each timeline parameter value in the target timeline parameter sequence indicates the slot interval between the HARQ-ACK feedback slot and the last symbol of the PDSCH; and when the target timeline parameter sequence consists of the first default timeline parameter sequence and a timeline offset factor, receiving a second control signaling sent by the base station and receiving a higher layer signaling sent by the base station, or receiving the second control signaling sent by the base station and obtaining the timeline offset factor predefined by a protocol; where the second control signaling carries a third target sequence index value and the high layer signaling carries a timeline offset factor; the third target sequence index value is one of multiple sequence index values, and a product of a target default parameter value corresponding to the third target sequence index value and the timeline offset factor is the target timeline parameter value, and the target default parameter value is one of the first default timeline parameter sequence; and each timeline parameter value in the target timeline parameter sequence indicates the slot interval between the HARQ-ACK feedback slot and the last symbol of the PDSCH.

According to an embodiment, the processor 801 is further configured to: report the capability parameter value of PDSCH reception processing for UE to the base station.

According to another embodiment, the capability parameter value of PDSCH reception processing for UE is any one of the following:

a time duration corresponding to the capability parameter value of PDSCH reception processing for UE is the same as a preset first reference time duration, and the first reference time duration is a time duration corresponding to the capability parameter value of PDSCH reception processing for a reference subcarrier space (Subcarrier Space, SCS) value, the time duration corresponding to the capability parameter value of PDSCH reception processing for UE is the same as a second reference time duration being a difference between the first reference time duration and a preset time offset length; and the capability parameter value of PDSCH reception processing for UE is associated with a target SCS value adopted by the PDSCH for UE.

According to yet another embodiment, when the time duration corresponding to the capability parameter value of PDSCH reception processing for UE is the same as the preset first reference time duration, the capability parameter value of PDSCH reception processing is $2^X$ times of the capability parameter value of PDSCH reception processing corresponding to the reference SCS value, where X denotes an integer equal to or greater than 0.

According to still yet another embodiment, when the time duration corresponding to the capability parameter value of PDSCH reception processing for UE is the same as the second reference time duration, the capability parameter value of PDSCH reception processing is $2^X$ times of the target value, the target value is a difference between the capability parameter value of PDSCH reception processing and the preset time offset value corresponding to the reference SCS value, and X denotes an integer equal to or greater than 0.

According to still yet another embodiment, when a time duration corresponding to the capability parameter value of PDSCH reception processing for UE is the same as a preset first reference time duration, the capability parameter value of PDSCH reception processing for UE is expressed by the following formula:

$$N1_u = N1_m \times 2^{u-m};$$

where $N1_u$ denotes the capability parameter value of PDSCH reception processing for UE. $N1_m$ denotes the capability parameter value of PDSCH reception processing corresponding to the reference SCS value, u denotes an index value of the target SCS value adopted by the PDSCH for UE, and m denotes the index value of the reference SCS value.

According to still yet another embodiment, when the time duration corresponding to the capability parameter value of PDSCH reception processing for UE is the same as the second reference time duration, the capability parameter value of PDSCH reception processing for UE is expressed by the following formula:

$$N1_u = (N1_m - D) \times 2^{u-m};$$

where, $N1_u$ denotes the capability parameter value of PDSCH reception processing for UE. $N1_m$ denotes the capability parameter value of PDSCH reception processing corresponding to the reference SCS value, D denotes a preset time offset value, u denotes an index value of the target SCS value adopted by the PDSCH for UE, and m denotes an index value of the reference SCS value.

According to still yet another embodiment, when the capability parameter value of PDSCH reception processing for UE is associated with the target SCS value adopted by the PDSCH for UE the capability parameter value of PDSCH reception processing for UE is expressed by the following formula:

$$N1_{u-1} \leq N1_u \leq 2N1_{u-1};$$

where, $N1_u$ denotes the capability parameter value of PDSCH reception processing for UE, $N1_{u-1}$ denotes the capability parameter value of PDSCH reception processing corresponding to an SCS value adjacent to the target SCS value.

The terminal according to the embodiment of the present application can implement the processes implemented by the terminal in the foregoing embodiments, and is not described here again to avoid repetition.

Figure 9:
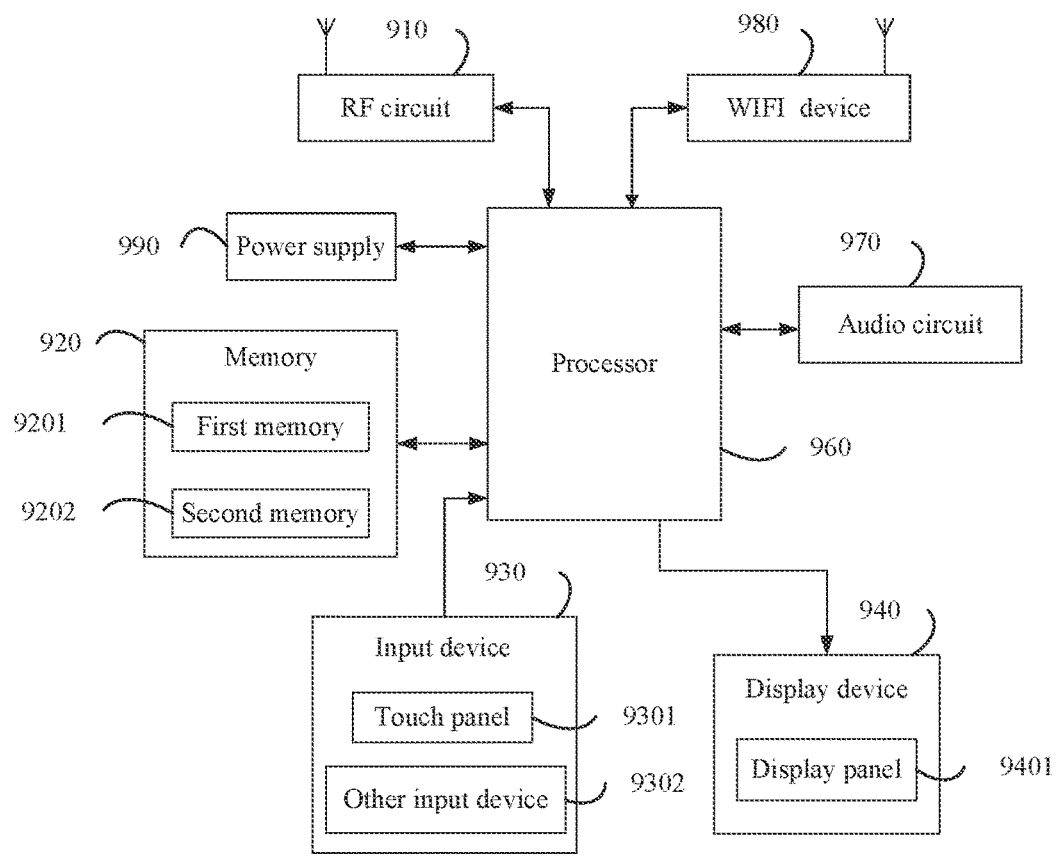
FIG. 9 is a second schematic structural diagram of the terminal according to an embodiment of the present application.

FIG. 9 is a schematic structural diagram of a terminal according to another embodiment of the present disclosure, where the terminal in FIG. 9 may be a mobile phone, a tablet computer, a personal digital assistant (Personal Digital Assistant, PDA), an electronic reader, a handheld game machine, a point of sales (Point of Sales, POS), a vehicle-mounted electronic device (e.g. vehicle-mounted computer), or the like. As shown in FIG. 9, the terminal includes a radio frequency (Radio Frequency, RF) circuit 910, a memory 920, an input device 930, a display device 940, a processor 960, an audio circuit 970, a WIFI (wireless fidelity) device 980, and a power supply 990. It should be noted that the structure shown in FIG. 9 is not intended to limit the terminal, and the terminal may include more or fewer components than those shown in FIG. 9, or may combine components, or split components, or arranged in different components.

The input device 930 may be used to receive numerical or character information input by a user and generate signal inputs related to user settings and function control of the terminal. In the embodiment of the present application, the input device 930 may include a touch panel 9301. The touch panel 9301, also called a touch screen, can collect touch operations (such as operations of a user on the touch panel 9301 by using a finger, a stylus pen, or any other suitable object or accessory) on or near the touch panel 9301, and drive the corresponding connection device according to a preset program. Or, the touch panel 9301 may include two parts, a touch detection device and a touch controller. The touch detection device detects the touch direction of a user, detects a signal brought by touch operation and transmits the signal to the touch controller; and the touch controller receives touch information from the touch detection device, converts the touch information into touch point coordinates, transmits the touch point coordinates to the processor 960, and receives and executes commands sent by the processor 960. In addition, the touch panel 9301 can be implemented in various types such as a resistive type, a capacitive type, an infrared ray, and a surface acoustic wave. The input device 930 may further include other input devices 9302 in addition to the touch panel 9301, and the other input devices 9302 may be used to receive input numerical or character information and generate key signal inputs related to user settings and function control of the terminal. In particular, other input devices 9302 can include, but are not limited to, one or more of a physical keyboard, function keys (such as volume control keys, switch keys, etc.), a trackball, a mouse, a joystick, an optical mouse (which is a touch-sensitive surface that does not display visual output, or is an extension of a touch-sensitive surface formed by a touch screen), and the like.

The display device 940 may be used to display information input by the user or information provided to the user and various menu interfaces of the terminal. The display device 940 may include a display panel 9401. The display panel 9401 may be configured as a liquid crystal display (Liquid Crystal Display, LCD), an organic light-emitting diode (Organic Light-Emitting Diode, OLED), or the like.

It should be noted that touch panel 9301 can cover display panel 9401 to form a touch display screen. After a touch operation on or near the touch display screen is detected, it is transmitted to the processor 960 to determine the type of the touch event, and then processor 960 provides a corresponding visual output on the touch display screen according to the type of the touch event.

The touch display screen includes an application program interface display area and a common control display area. The arrangement of the application program interface display area and the common control display area is not limited, and may be any arrangement that can distinguish two display areas, such as an up-down arrangement, a left-right arrangement, and the like. The application interface display area may be used to display an interface of an application. Each interface may contain at least one application icon and/or widget desktop control or the like interface element. The application interface display area may also be an empty interface that contain no any content. The common control display area is used for displaying controls with high utilization rate, such as application icons like setting buttons, interface numbers, scroll bars and phone book icons.

The RF circuit 910 may be used for receiving and transmitting signals during a message transmission or communication process, and particularly, for transmitting the downlink information to the processor 960 after receiving the downlink information from the network side, and for transmitting the data related uplink to the network side. In general, RF circuit 910 includes, but not limited to, an antenna, at least one amplifier, a transceiver, a coupler, a low noise amplifier (Low Noise Amplifier, LNA), a duplexer, and the like. In addition, RF circuit 910 may also communicate with networks and other devices via wireless communication. The wireless communication may use any communication standard or protocol, including but not limited to a global system for mobile communication (GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), email, short messaging service (Short Messaging Service, SMS), and the like.

The memory 920 is used to store software programs and modules, and the processor 960 executes various functional applications and data processing of the terminal by executing the software programs and modules stored in the memory 920. The memory 920 may mainly include a program storage area and a data storage area, where the program storage area may store an operating system, an application program required by at least one function (such as a sound playing function, an image playing function, etc.), and the like; and the storage data area may store data (such as audio data, a phone book, etc.) created according to the use of the terminal, etc. Further, the memory 920 may include high speed random access memory, and may also include non-volatile memory, such as at least one magnetic disk storage device, flash memory device, or other volatile solid state storage device.

The processor 960 is a control center of the terminal, is connected to various parts of the entire mobile terminal by using various interfaces and lines, and performs various functions of the terminal and processes data by operating or executing software programs and/or modules stored in the first memory 9201 and calling data stored in the second memory 9202, to monitor the mobile terminal as a whole. In one embodiment, the processor 960 may include one or more processing units.

In the embodiment of the present application, by calling the software programs and/or modules stored in the first memory 9201 and/or data stored in the second memory 9202, the processor 960 is configured to obtain a target timeline parameter value for indicating a timing at which the terminal feeds back HARQ-ACK; where a target timeline parameter sequence is predefined between the terminal and a base station, and the target timeline parameter sequence includes multiple sequence index values and multiple timeline parameter values which have one-to-one correspondence; the timeline parameter value indicates slot intervals between a HARQ-ACK feedback slot and the last symbol of the PDSCH, or the timeline parameter value indicates a slot where a PUCCH resource is located and the slot where the PUCCH resource is located corresponds to the HARQ-ACK feedback slot; and the target timeline parameter value is one of multiple timeline parameter values, and a time corresponding to the target timeline parameter value is equal to or greater than a time corresponding to a capability parameter value of PDSCH reception processing for UE; and feed back the HARQ-ACK to the base station on the slot corresponding to the target timeline parameter value.

The terminal according to the embodiment of the present application can implement the processes implemented by the terminal in the foregoing embodiments, and is not described here again to avoid repetition.

Figure 10:
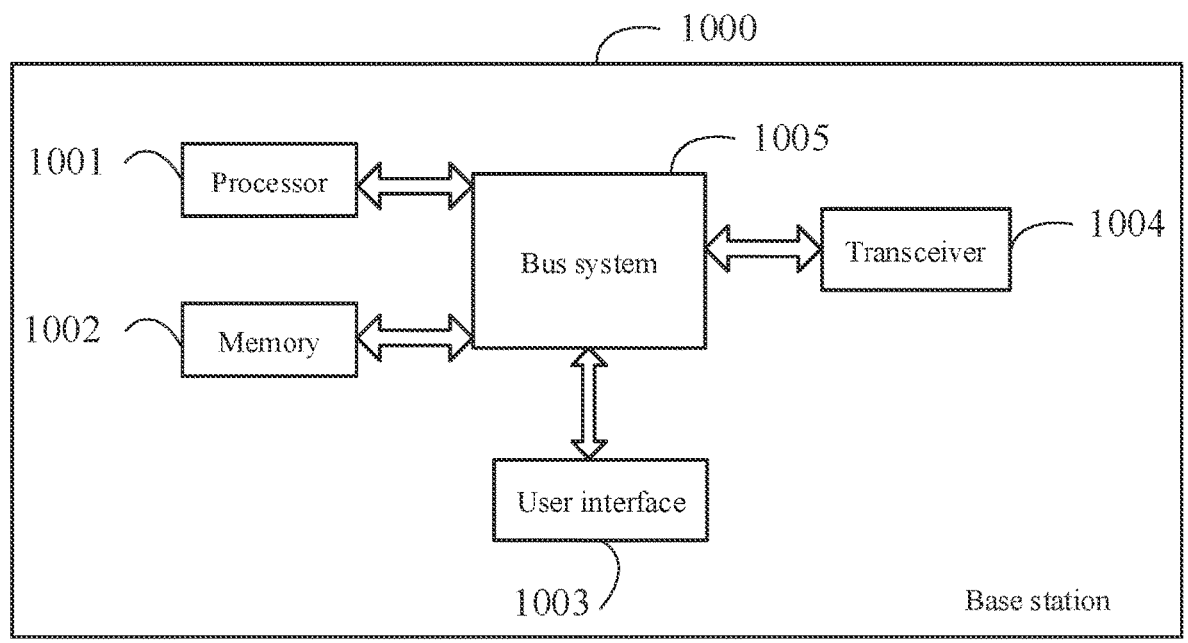
FIG. 10 is a schematic structural diagram of a base station according to an embodiment of the present application.

FIG. 10 is a schematic structural diagram of a base station according to an embodiment of the present application, and as shown in FIG. 10, the base station 1000 may include at least one processor 1001, a memory 1002, at least one other user interface 1003, and a transceiver 1004. The various components in the base station 1000 are coupled together by a bus system 1005. The bus system 1005 is used for the connection and communication between the components. The bus system 1005 includes, in addition to a data bus, a power bus, a control bus, and a status signal bus. For clarity of illustration, the various buses are labeled as the bus system 1005 in FIG. 10, and the bus system 1005 may include any number of interconnected buses and bridges, with one or more processors, represented by the processor 1001, and various circuits, represented by the memory 1002, being linked together. The bus system may also link together various other circuits such as peripherals, voltage regulators, power management circuits, and the like, which will not be described any further in this application. The bus interface provides an interface. The transceiver 1004 may be multiple elements including a transmitter and a receiver that provide a means for communicating with various other device on a transmission medium. The user interface 1003 may also be an interface capable of interfacing with a desired device for different user devices, including but not limited to a keypad, display, speaker, microphone, joystick, etc.

In an embodiment, the memory 1002 may be either volatile memory or nonvolatile memory, or can include both volatile and nonvolatile memory. The non-volatile Memory may be a read-only memory (Read-Only Memory, ROM), a programmable ROM (Programmable ROM, PROM), an erasable PROM (Erasable PROM, EPROM), an electrically erasable PROM (Electrically Erasable PROM, EEPROM), or a flash memory. The volatile memory may be a random access memory (Random Access Memory, RAM) which serves as an external cache. By way of example, and not limitation, many forms of RAM are available, such as static random access memory (Static Random Access Memory, SRAM), dynamic random access memory (Dynamic Random Access Memory. DRAM), synchronous dynamic random access memory (Synchronous Dynamic Random Access Memory, SDRAM), double data rate synchronous dynamic random access memory (Double Data Rate Synchronous Dynamic Random Access Memory DDRSDRAM), enhanced synchronous SDRAM (Enhanced Synchronous SDRAM, ESDRAM), synchronous link DRAM (Synchronous Link DRAM, SLDRAM), and direct Rambus RAM (Direct Rambus RAM, DRRAM). The memory 1002 in the systems and methods described by the various embodiments of the present application include, but not limited to, these and any other suitable types of memory.

The processor 1001 is responsible for managing the bus system and general processing, and the memory 1002 may store computer programs or instructions used by the processor 1001 in performing operations, in particular, the processor 1001 may be configured to: obtain a capability parameter value of PDSCH reception processing for UE; determine a target timeline parameter sequence for the terminal to feed back HARQ-ACK, where the target timeline parameter sequence includes multiple sequence index values and multiple timeline parameter values which have one-to-one correspondence; the timeline parameter value indicates slot intervals between a HARQ-ACK feedback slot and the last symbol of the PDSCH, or the timeline parameter value indicates a slot where a PUCCH resource is located and the slot where the PUCCH resource is located corresponds to the HARQ-ACK feedback slot; and a time corresponding to one or more timeline parameter values in the target timeline parameter sequence is equal to or greater than a time corresponding to the capability parameter value of PDSCH reception processing for UE; and to transmit HARQ-ACK feedback indication information to the terminal to indicate a target sequence index value corresponding to a target timeline parameter value to the terminal, where the target sequence index value is one of multiple sequence index values.

According to another embodiment, the processor 1001 is further configured to: receive the capability parameter value of PDSCH reception processing for UE reported by the terminal; or obtain the capability parameter value of PDSCH reception processing for UE predefined by a protocol.

According to yet another embodiment, the processor 1001 is further configured to perform any one of the following steps:

obtaining a timeline offset value for the terminal to feed back HARQ-ACK, and determining a first target timeline parameter sequence according to a first default timeline parameter sequence of the HARQ-ACK and the timeline offset value, and each timeline parameter value in the first target timeline parameter sequence indicates the slot interval between the HARQ-ACK feedback slot and the last symbol of the PDSCH;

obtaining a timeline offset factor for the terminal to feed back HARQ-ACK, and determining a second target timeline parameter sequence according to the first default timeline parameter sequence of the HARQ-ACK and the timeline offset factor, and each timeline parameter value in the second target timeline parameter sequence indicates the slot interval between the HARQ-ACK feedback slot and the last symbol of the PDSCH;

determining the second default timeline parameter sequence of the HARQ-ACK as a third target timeline parameter sequence, where each timeline parameter value in the third target timeline parameter sequence indicates the i-th slot with PUCCH resources after the terminal receives the PDSCH, and i is a corresponding timeline parameter value;

determining the first default timeline parameter sequence of the HARQ-ACK as a fourth target timeline parameter sequence, and each timeline parameter value in the fourth target timeline parameter sequence indicates the slot interval between the HARQ-ACK feedback slot and the last symbol of the PDSCH; and the target timeline parameter sequence is one of the first target timeline parameter sequence, the second target timeline parameter sequence, the third target timeline parameter sequence, or the fourth target timeline parameter sequence.

According to yet another embodiment, the obtaining of the timeline offset value of the terminal feedback HARQ-ACK includes any one of the following: determining a preset value as the timeline offset value: determining the timeline offset value based on a target SCS value adopted by the PDSCH for UE; and determining the timeline offset value based on the capability parameter value of PDSCH reception processing for UE corresponding to the target SCS value adopted by the PDSCH for UE.

According to still yet another embodiment, the processor 1001 is further configured to set the timeline offset value correspondingly for the target SCS value; or, obtain the timeline offset value based on an index value of a reference SCS value and an index value of the target SCS value by the following formula:

$$k\_d_u \geq z \times 2^{u-m};$$

where $k\_d_u$ denotes the timeline offset value, z denotes a positive integer, u denotes the index value of the target SCS value, and m denotes the index value of the reference SCS value.

According to still yet another embodiment, the processor 1001 is further configured to: obtain the timeline offset value based on the capability parameter value of PDSCH reception processing for UE corresponding to the target SCS value by the following formula:

$$k\_d_u \geq \lceil N1/L \rceil, \text{ or } k\_d_u \geq \lfloor N1/L \rfloor;$$

where $k\_d_u$ denotes the timeline offset value, N1 denotes the capability parameter value of PDSCH reception processing for UE corresponding to the target SCS value and the capability parameter value of PDSCH reception processing for UE is expressed in terms of the number of symbols, and L denotes the number of symbols included in each slot.

According to still yet another embodiment, the processor 1001 is further configured to: determine a sum of the timeline offset value and the first default timeline parameter sequence as the first target timeline parameter sequence.

According to still yet another embodiment, the processor 1001 is further configured to: determine a preset value as the timeline offset factor; or, determine the timeline offset factor based on a target SCS value adopted by the PDSCH for UE.

According to still yet another embodiment, the processor 1001 is further configured to: set the timeline offset factor correspondingly for the target SCS value; or, obtain the timeline offset factor based on an index value of a reference SCS value and an index value of the target SCS value by the following formula:

$$k\_c_u = 2^{u-m};$$

where $k\_c_u$ denotes the timeline offset factor, u denotes the index value of the target SCS value, and m denotes the index value of the reference SCS value.

According to still yet another embodiment, the processor 1001 is further configured to: determine a product of the timeline offset factor and the first default timeline parameter sequence as the second target timeline parameter sequence.

According to still yet another embodiment, the processor 1001 is further configured to:
when the target timeline parameter sequence is the third target timeline parameter sequence or the fourth target timeline parameter sequence, transmit a first control signaling to the terminal, where the first control signaling carries a first target sequence index value, the first target sequence index value is one of multiple sequence index values, and a timeline parameter value corresponding to the first target sequence index value is the target timeline parameter value;
when the target timeline parameter sequence is the first target timeline parameter sequence, transmit a second control signaling to the terminal and transmit a higher layer signaling to the terminal, where the second control signaling carries a second target sequence index value, and the higher layer signaling carries a timeline offset value, and the second target sequence index value is one of multiple sequence index values; and
when the target timeline parameter sequence is the second target timeline parameter sequence, transmit a second control signaling to the terminal and transmit a higher layer signaling to the terminal, where the second control signaling carries a third target sequence index value, and the higher layer signaling carries a timeline offset factor, and the third target sequence index value is one of multiple sequence index values.

The method disclosed in the embodiments of the present application may be applied to the processor 1001, or may be implemented by the processor 1001. The processor 1001 may be an integrated circuit chip having signal processing capabilities. In the process of implementation, the steps of the above method may be implemented by integrated logic circuits of hardware or instructions in software form in the processor 1001. The Processor 1001 may be a general purpose processor, a digital signal processor (Digital Signal Processor, DSP), an application specific integrated circuit (Application Specific Integrated Circuit, ASIC), an field programmable gate array (Field Programmable Gate Array, FPGA) or other programmable logic device, discrete gate or transistor logic, or discrete hardware components. The various methods, steps, and logic modules disclosed in the embodiments of the present application may be implemented or performed by the processor 1001. A general purpose processor may be a microprocessor or the processor may be any conventional processor or the like. The steps of the method disclosed in connection with the embodiments of the present application may be directly implemented by a hardware decoding processor, or implemented by a combination of hardware and software modules in the decoding processor. The software modules may be located in RAM, flash, ROM, PROM, or EPROM, registers, etc. The storage medium is located in the memory 1002, and the processor 1001 reads the information in the memory 1002 and completes the steps of the method in combination with the hardware.

It should be noted that the embodiments described herein may be implemented in hardware, software, firmware, middleware, microcode, or a combination thereof. For a hardware implementation, the processing units may be implemented within one or more application specific integrated circuits (Application Specific Integrated Circuits, ASICs). Digital Signal Processors (DSPs), digital signal processing devices (Digital Signal Processing Devices, DSPDs), programmable logic devices (Programmable Logic Devices, PLDs), field programmable gate arrays (Field Programmable Gate Arrays, FPGAs), general purpose processors, controllers, micro-controllers, microprocessors, other electronic units designed to perform the functions described herein, or a combination thereof.

For a software implementation, the described techniques may be implemented by performing the modules (e.g., procedures, functions, and so on) with the functions described in the embodiments of the application. The software codes may be stored in a memory and executed by a processor. The memory may be implemented inside the processor or outside the processor.

The base station provided in the embodiment of the present application can implement the processes implemented by the base station in the foregoing embodiments, and is not described here again to avoid repetition.

The foregoing mainly introduces the solutions according to the embodiments of the present application from the perspective of electronic devices. It should be noted that, in order to implement the functions described above, the electronic device according to the embodiments of the present application includes a hardware structure and/or a software module for performing each function. It should be noted that the various illustrative elements and algorithm steps described in connection with the embodiments disclosed herein may be implemented by hardware or combinations of hardware and computer software.

Whether a function is performed in hardware or computer software drives hardware depends upon the particular application and design constraints of the solution. Varying ways for each particular application to realize the described function, and such implementation should not be interpreted as causing a departure from the scope of the present application.

In the embodiment of the present application, the electronic device and the like may be divided into functional modules according to the method example, for example, each functional module may be divided corresponding to each function, or two or more functions may be integrated into one processing module. The integrated module can be realized in a hardware mode, and can also be realized in a software functional module mode.

In the embodiment of the present application, the division of the modules is schematic, and is only one logic function division, and another division manner may be available in actual implementation.

For convenience and simplicity of description, the above division of functional modules is only used for illustration, and in practical applications, the above function distribution may be performed by different functional modules as needed, that is, the internal structure of the device may be divided into different functional modules to perform all or part of the above described functions. For the specific working processes of the system, the device and the device described above, reference may be made to the corresponding processes in the foregoing method embodiments, and details are not described here again.

In the several embodiments according to the present application, it should be noted that the disclosed device and method may be implemented in other manners. For example, the above-described device embodiments are merely illustrative, and for example, the division of the devices are only one type of logical functional division, and other divisions may be realized in practice, for example, multiple units or components may be combined or integrated into another system, or some features may be omitted, or not executed. In addition, the shown or discussed coupling or direct coupling or communication connection may be an indirect coupling or communication connection through some interfaces, devices or units.

The devices described as separate components may or may not be physically separated, and components displayed as devices may or may not be physical devices, may be located in one place, or may be distributed on multiple network devices. Some or all of the devices can be selected according to actual needs to implement the purpose of the solution of the embodiment.

In addition, respective functional devices in the embodiments of the present application may be integrated into one processing unit, or the respective functional units may exist alone physically, or two or more units may be integrated into one unit. The integrated unit may be implemented in the form of a software functional unit.

The integrated unit, if implemented in the form of a software functional unit and sold or used as an independent product, may be stored in a computer readable storage medium. Based on such understanding, all or part of the solution can be embodied in the form of a software product, and the computer software product is stored in a storage medium and includes several instructions to cause a computer device (which may be a personal computer, a server, or a network device, etc.) or a processor to execute all or part of the steps of the method according to the embodiments of the present application. The computer storage medium is a non-transitory medium, including: various mediums that can store program code, such as flash memory, removable hard disk, read-only memory, random-access memory, magnetic disk or optical disk, etc.

On the other hand, embodiments of the present application further provide a non-transitory computer-readable storage medium, on which computer programs are stored, and when the computer programs are executed by a processor, causes the processor to perform the method provided in the foregoing embodiments and the same effect can be realized, which is not described herein again.

What is claimed is:

1. Hybrid Automatic Repeat Request (HARQ) feedback method, performed by a terminal, comprising:
obtaining a target timeline parameter value for indicating a timing at which the terminal feeds back HARQ-ACK; a target timeline parameter sequence being predefined between the terminal and a base station, and the target timeline parameter sequence comprising multiple sequence index values and multiple timeline parameter values which have one-to-one correspondence; the timeline parameter value indicating slot intervals between a HARQ-ACK feedback slot and a last symbol of Physical Downlink Shared Channel (PDSCH), or the timeline parameter value indicating a slot where a Physical Uplink Control Channel (PUCCH) resource is located and the slot where the PUCCH resource is located corresponding to the HARQ-ACK feedback slot; and the target timeline parameter value being one of multiple timeline parameter values, and a time corresponding to the target timeline parameter value being equal to or greater than a time corresponding to a capability parameter value of PDSCH reception processing for UE; and
feeding back the HARQ-ACK to the base station on the slot corresponding to the target timeline parameter value,
wherein the obtaining the target timeline parameter value for indicating the timing at which the terminal feeds back HARQ-ACK comprises:
receiving a second control signaling sent by the base station and obtaining a predefined target timeline parameter sequence, wherein the second control signaling carries a target sequence index value, the target sequence index value is one of the multiple sequence index values, a timeline parameter value corresponding to the target sequence index value is the target timeline parameter value, the timeline parameter value comprised in the target timeline parameter sequence is obtained from a product of a default parameter value in a first default timeline parameter sequence and a timeline offset factor, and the first default timeline parameter sequence is {1, 2, 3, 4, 5, 6, 7, 8}.

2. The method of claim 1, wherein the obtaining the target timeline parameter value for indicating the timing at which the terminal feeds back HARQ-ACK comprises any one of the following steps of:
when the target timeline parameter sequence is a first default timeline parameter sequence or a second default timeline parameter sequence, receiving a first control signaling sent by the base station, wherein the first control signaling carries a first target sequence index value, the first target sequence index value is one of multiple sequence index values, and a timeline parameter value corresponding to the first target sequence index value is the target timeline parameter value; when the target timeline parameter sequence is the second default timeline parameter sequence, each timeline parameter value in the target timeline parameter sequence indicates the i-th slot with PUCCH resource after the terminal receives the PDSCH, and i is a corresponding timeline parameter value; and when the target timeline parameter sequence is the first default timeline parameter sequence, each timeline parameter value in the target timeline parameter sequence indicates the slot interval between the HARQ-ACK feedback slot and the last symbol of the PDSCH;

when the target timeline parameter sequence consists of the first default timeline parameter sequence and a timeline offset value, receiving a second control signaling sent by the base station and receiving a higher layer signaling sent by the base station, or receiving the second control signaling sent by the base station and obtaining the timeline offset value predefined by a protocol; wherein the second control signaling carries a second target sequence index value, and the higher layer signaling carries a timeline offset value; the second target sequence index value is one of multiple sequence index values, a sum of a target default parameter value corresponding to the second target sequence index value and the timeline offset value is the target timeline parameter value, and the target default parameter value is one of the first default timeline parameter sequence; and each timeline parameter value in the target timeline parameter sequence indicates slot intervals between the HARQ-ACK feedback slot and the last symbol of the PDSCH; and when the target timeline parameter sequence consists of the first default timeline parameter sequence and a timeline offset factor, receiving a second control signaling sent by the base station and receiving a higher layer signaling sent by the base station, or receiving the second control signaling sent by the base station and obtaining the timeline offset factor predefined by a protocol; wherein the second control signaling carries a third target sequence index value and the high layer signaling carries a timeline offset factor; the third target sequence index value is one of multiple sequence index values, and a product of a target default parameter value corresponding to the third target sequence index value and the timeline offset factor is the target timeline parameter value, and the target default parameter value is one of the first default timeline parameter sequence; and each timeline parameter value in the target timeline parameter sequence indicates slot intervals between a HARQ-ACK feedback slot and the last symbol of the PDSCH.

3. The method of claim 1, wherein before obtaining the target timeline parameter value for indicating the timing at which the terminal feeds back HARQ-ACK, the method further comprises:
reporting the capability parameter value of PDSCH reception processing for UE to the base station.

4. The method of claim 1, wherein the capability parameter value of PDSCH reception processing for UE satisfies any one of the following:
a time duration corresponding to the capability parameter value of PDSCH reception processing for UE is the same as a preset first reference time duration, and the first reference time duration is a time duration corresponding to the capability parameter value of PDSCH reception processing corresponding to a reference Subcarrier Space (SCS) value;
the time duration corresponding to the capability parameter value of PDSCH reception processing for UE is the same as a second reference time duration being a difference between the first reference time duration and a preset time offset length; or
the capability parameter value of PDSCH reception processing for UE is associated with a target SCS value adopted by the PDSCH for UE.

5. The method of claim 4, wherein when the time duration corresponding to the capability parameter value of PDSCH reception processing for UE is the same as the preset first reference time duration, the capability parameter value of PDSCH reception processing is $2^X$ times of the capability parameter value of PDSCH reception processing corresponding to the reference SCS value, and X denotes an integer equal to or greater than 0.

6. The method of claim 4, wherein when the time duration corresponding to the capability parameter value of PDSCH reception processing for UE is the same as the second reference time duration, the capability parameter value of PDSCH reception processing is $2^X$ times of a target value being a difference between the capability parameter value of PDSCH reception processing corresponding to the reference SCS value and a preset time offset value, and X denotes an integer equal to or greater than 0.

7. The method of claim 4, wherein when the time duration corresponding to the capability parameter value of PDSCH reception processing for UE is the same as the preset first reference time duration, the capability parameter value of PDSCH reception processing for UE is expressed by the following formula:

$$N1_u = N1_m \times 2^{u-m};$$

where $N1_u$ denotes the capability parameter value of PDSCH reception processing for UE, $N1_m$ denotes the capability parameter value of PDSCH reception processing corresponding to the reference SCS value, u denotes an index value of the target SCS value adopted by the PDSCH for UE, and m denotes an index value of the reference SCS value;
in case that the target SCS value adopted by the PDSCH for UE is 480 KHz, $N1_u$ is equal to 80 without additional demodulation reference signal (DMRS); and/or $N1_u$ is equal to 96 with additional DMRS and u is equal to 5;
in case that the target SCS value adopted by the PDSCH for UE is 960 KHz, $N1_u$ is equal to 160 without additional demodulation reference signal (DMRS); and/or $N1_u$ is equal to 192 with additional DMRS and u is equal to 6.

8. The method of claim 4, wherein when the time duration corresponding to the capability parameter value of PDSCH reception processing for UE is the same as the second reference time duration, the capability parameter value of PDSCH reception processing for UE is expressed by the following formula:

$$N1_u = (N1_m - D) \times 2^{u-m};$$

where $N1_u$ denotes the capability parameter value of PDSCH reception processing for UE, $N1_m$ denotes the capability parameter value of PDSCH reception processing corresponding to the reference SCS value, D denotes a preset time offset value, u denotes an index value of the target SCS value adopted by the PDSCH for UE, and m denotes an index value of the reference SCS value.

9. The method of claim 4, wherein when the capability parameter value of PDSCH reception processing for UE is associated with the target SCS value adopted by the PDSCH for UE, the capability parameter value of PDSCH reception processing for UE is expressed by the following formula:

$$N1_{u-1} \leq N1_u \leq 2N1_{u-1};$$

where $N1_u$ denotes the capability parameter value of PDSCH reception processing for UE, $N1_{u-1}$ denotes the capability parameter value of PDSCH reception processing corresponding to an SCS value adjacent to the target SCS value.

10. A Hybrid Automatic Repeat Request (HARQ) feedback method, comprising:
   obtaining a capability parameter value of Physical Downlink Shared Channel (PDSCH) for UE;
   determining a target timeline parameter sequence for the terminal to feed back HARQ-ACK, the target timeline parameter sequence comprising multiple sequence index values and multiple timeline parameter values which have one-to-one correspondence; the timeline parameter value indicating slot intervals between a HARQ-ACK feedback slot and a last symbol of PDSCH, or the timeline parameter value indicating a slot where a Physical Uplink Control Channel (PUCCH) resource is located and the slot where the PUCCH resource is located corresponding to the HARQ-ACK feedback slot; and a time corresponding to one or more timeline parameter values in the target timeline parameter sequence is equal to or greater than a time corresponding to the capability parameter value of PDSCH reception processing for UE; and
   transmitting HARQ-ACK feedback indication information to the terminal, to indicate a target sequence index value corresponding to a target timeline parameter value to the terminal, wherein the target sequence index value is one of multiple sequence index values,
   wherein the determining the target timeline parameter sequence for the terminal to feed back HARQ-ACK comprises:
   obtaining a predefined target timeline parameter sequence, wherein the timeline parameter value comprised in the target timeline parameter sequence is obtained from a product of a default parameter value in a first default timeline parameter sequence and a timeline offset factor, and the first default timeline parameter sequence is {1, 2, 3, 4, 5, 6, 7, 8}.

11. The method of claim 10, wherein the obtaining the capability parameter value of PDSCH reception processing for UE comprises:
   receiving the capability parameter value of PDSCH reception processing for UE reported by the terminal; or
   obtaining the capability parameter value of PDSCH reception processing for UE predefined by a protocol.

12. The method of claim 10, wherein the determining the target timeline parameter sequence for the terminal to feed back HARQ-ACK comprises any one of the following steps of:
   obtaining a timeline offset value for the terminal to feed back HARQ-ACK, and determining a first target timeline parameter sequence according to a first default timeline parameter sequence of the HARQ-ACK and the timeline offset value, wherein each timeline parameter value in the first target timeline parameter sequence indicates the slot interval between the HARQ-ACK feedback slot and the last symbol of the PDSCH;
   obtaining a timeline offset factor for the terminal to feed back HARQ-ACK, and determining a second target timeline parameter sequence according to the first default timeline parameter sequence of the HARQ-ACK and the timeline offset factor, wherein each timeline parameter value in the second target timeline parameter sequence indicates the slot interval between the HARQ-ACK feedback slot and the last symbol of the PDSCH;
   determining a second default timeline parameter sequence of the HARQ-ACK as a third target timeline parameter sequence, wherein each timeline parameter value in the third target timeline parameter sequence indicates the i-th slot with PUCCH resource after the terminal receives the PDSCH, and i is a corresponding timeline parameter value;
   determining the first default timeline parameter sequence of the HARQ-ACK as a fourth target timeline parameter sequence, wherein each timeline parameter value in the fourth target timeline parameter sequence indicates slot intervals between the HARQ-ACK feedback slot and the last symbol of the PDSCH; and
   the target timeline parameter sequence is one of the first target timeline parameter sequence, the second target timeline parameter sequence, the third target timeline parameter sequence, or the fourth target timeline parameter sequence.

13. The method of claim 12, wherein the obtaining the timeline offset value for the terminal to feed back HARQ-ACK comprises any one of the following:
   determining a preset value as the timeline offset value;
   determining the timeline offset value based on a target Subcarrier Space (SCS) value adopted by the PDSCH for UE; and
   determining the timeline offset value based on the capability parameter value of PDSCH reception processing for UE corresponding to the target SCS value adopted by the PDSCH for UE;
   wherein the determining the timeline offset value based on the target SCS value adopted by the PDSCH for UE comprises:
   setting the timeline offset value correspondingly for the target SCS value; or, obtaining the timeline offset value based on an index value of a reference SCS value and an index value of the target SCS value by the following formula:

$$k\_d_u \geq z \times 2^{u-m};$$

where $k\_d_u$ denotes the timeline offset value, z denotes a positive integer, u denotes the index value of the target SCS value, and m denotes the index value of the reference SCS value;
   wherein the determining the timeline offset value based on the capability parameter value of PDSCH reception processing for UE corresponding to the target SCS value adopted by the PDSCH for UE comprises:
   obtaining the timeline offset value based on the capability parameter value of PDSCH reception processing for UE corresponding to the target SCS value by the following formula:

$$k\_d_u \geq \lceil N1/L1 \rceil, \text{ or } k\_d_u \geq \lfloor N1/L \rfloor;$$

where $k\_d_u$ denotes the timeline offset value, N1 denotes the capability parameter value of PDSCH reception processing for UE corresponding to the target SCS value and the capability parameter value of PDSCH reception processing for UE is expressed in terms of the number of symbols, and L denotes the number of symbols included in each slot.

14. The method of claim 12, wherein the determining the first target timeline parameter sequence according to the first default timeline parameter sequence of the HARQ-ACK and the timeline offset value comprises:
   determining a sum of the timeline offset value and the first default timeline parameter sequence as the first target timeline parameter sequence.

15. The method of claim 12, wherein the obtaining the timeline offset factor for the terminal to feed back HARQ-ACK comprises:
   determining a preset value as the timeline offset factor; or
   determining the timeline offset factor based on a target SCS value adopted by the PDSCH for UE;
   wherein the determining the timeline offset factor based on the target SCS value adopted by the PDSCH for UE comprises:
   setting the timeline offset factor for the target SCS value; or
   obtaining the timeline offset factor based on an index value of a reference SCS value and an index value of the target SCS value by the following formula:

$k\_c_u = 2^{u-m}$;

where $k\_c_u$ denotes the timeline offset factor, u denotes the index value of the target SCS value, and m denotes the index value of the reference SCS value.

16. The method of claim 12, wherein the determining the second target timeline parameter sequence according to the first default timeline parameter sequence of the HARQ-ACK and the timeline offset factor comprises:
   determining a product of the timeline offset factor and the first default timeline parameter sequence as the second target timeline parameter sequence.

17. The method of claim 12, wherein the transmitting HARQ-ACK feedback indication information to the terminal comprises:
   when the target timeline parameter sequence is the third target timeline parameter sequence or the fourth target timeline parameter sequence, transmitting a first control signaling to the terminal, wherein the first control signaling carries a first target sequence index value, the first target sequence index value is one of multiple sequence index values, and a timeline parameter value corresponding to the first target sequence index value is the target timeline parameter value;
   when the target timeline parameter sequence is the first target timeline parameter sequence, transmitting a second control signaling to the terminal and transmitting a higher layer signaling to the terminal, wherein the second control signaling carries a second target sequence index value, the higher layer signaling carries a timeline offset value, and the second target sequence index value is one of multiple sequence index values; and
   when the target timeline parameter sequence is the second target timeline parameter sequence, transmitting a second control signaling to the terminal and transmitting a higher layer signaling to the terminal, wherein the second control signaling carries a third target sequence index value, the higher layer signaling carries a timeline offset factor, and the third target sequence index value is one of multiple sequence index values.

18. A terminal comprising a memory, a processor and a computer program stored in the memory and executable on the processor, wherein the processor when executing the computer program performs the following steps:
   obtaining a target timeline parameter value for indicating a timing at which the terminal feeds back Hybrid Automatic Repeat Request-Acknowledgement (HARQ-ACK); a target timeline parameter sequence being predefined between the terminal and a base station, and the target timeline parameter sequence comprising multiple sequence index values and multiple timeline parameter values which have one-to-one correspondence; the timeline parameter value indicating slot intervals between a HARQ-ACK feedback slot and a last symbol of Physical Downlink Shared Channel (PDSCH), or the timeline parameter value indicating a slot where Physical Uplink Control Channel (PUCCH) resource is located and the slot where the PUCCH resource is located corresponding to the HARQ-ACK feedback slot; and the target timeline parameter value being one of multiple timeline parameter values, and a time corresponding to the target timeline parameter value being equal to or greater than a time corresponding to a capability parameter value of PDSCH reception processing for UE; and
   feeding back the HARQ-ACK to the base station on the slot corresponding to the target timeline parameter value,
   wherein the obtaining the target timeline parameter value for indicating the timing at which the terminal feeds back HARQ-ACK comprises:
   receiving a second control signaling sent by the base station and obtaining a predefined target timeline parameter sequence, wherein the second control signaling carries a target sequence index value, the target sequence index value is one of the multiple sequence index values, a timeline parameter value corresponding to the target sequence index value is the target timeline parameter value, the timeline parameter value comprised in the target timeline parameter sequence is obtained from a product of a default parameter value in a first default timeline parameter sequence and a timeline offset factor, and the first default timeline parameter sequence is {1, 2, 3, 4, 5, 6, 7, 8}.

19. A base station comprising a memory, a processor and a computer program stored in the memory and executable on the processor, wherein the processor when executing the computer program performs steps of claim 10.

20. The method of claim 1, wherein the timeline offset factor is 4 in case that a target Subcarrier Space (SCS) value adopted by the PDSCH for UE is 480KHz, and the timeline offset factor is 8 in case that the target SCS value adopted by the PDSCH for UE is 960KHz;
   wherein in case that the target SCS value adopted by the PDSCH for UE is 960KHz, the predefined target timeline parameter sequence comprises a first timeline parameter value, the first timeline parameter value is 13;
   wherein in case that the target SCS value adopted by the PDSCH for UE is 480KHz, the predefined target timeline parameter sequence comprises a second timeline parameter value, the first timeline parameter value is 1+[N1/14]; wherein N1 represents a capability parameter value of PDSCH reception processing for UE corresponding to the target SCS value.

* * * * *